(12) United States Patent
Toliyat et al.

(10) Patent No.: US 10,998,825 B2
(45) Date of Patent: May 4, 2021

(54) METHOD AND APPARATUS FOR MEDIUM-VOLTAGE ELECTRONIC POWER CONVERSION

(71) Applicant: The Texas A&M University System, College Station, TX (US)

(72) Inventors: Hamid A. Toliyat, College Station, TX (US); Seyed Morteza Moosavi Torshizi, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/272,197

(22) Filed: Feb. 11, 2019

(65) Prior Publication Data

US 2019/0252989 A1 Aug. 15, 2019

Related U.S. Application Data

(60) Provisional application No. 62/629,446, filed on Feb. 12, 2018.

(51) Int. Cl.
*H02M 5/22* (2006.01)
*H02M 3/335* (2006.01)
(Continued)

(52) U.S. Cl.
CPC ......... *H02M 3/33584* (2013.01); *H02J 1/102* (2013.01); *H02M 1/4258* (2013.01);
(Continued)

(58) Field of Classification Search
CPC ................................................. H02M 5/02–38
See application file for complete search history.

(56) References Cited

U.S. PATENT DOCUMENTS 7,599,196 B2 10/2009 Alexander
2017/0222539 A1* 8/2017 Nishimoto .......... H02J 13/0082
(Continued)

OTHER PUBLICATIONS

D. Chen, "Novel Current-Mode AC/AC Converters With High-Frequency AC Link," in IEEE Transactions on Industrial Electronics, vol. 55, No. 1, pp. 30-37, Jan. 2008. (Year: 2008).*
(Continued)

*Primary Examiner* — Peter M Novak
(74) *Attorney, Agent, or Firm* — Winstead PC

(57) ABSTRACT

A power converter includes a multiple-winding transformer. The multiple-winding transformer provides an electromagnetic link between an input side and an output side of the power converter. An inductor is arranged on at least one of the input side and the output side of the power converter in parallel with the multiple-winding transformer. At least one first capacitor is arranged on the input side of the power converter in parallel with the multiple-winding transformer and the inductor. At least one second capacitor is arranged on the output side of the power converter in parallel with the multiple-winding transformer. The inductor, the at least one first capacitor, and the at least one second capacitor define a parallel resonance tank. A first plurality of switching devices is arranged on the input side. A second plurality of switching devices is arranged on the output side.

8 Claims, 41 Drawing Sheets

(51) Int. Cl.
  *H02M 1/42*     (2007.01)
  *H02J 1/10*     (2006.01)
  *H02M 3/337*    (2006.01)
  *H02M 7/538*    (2007.01)
  *H02M 1/00*     (2006.01)
  *H02M 7/49*     (2007.01)
  *H02M 1/088*    (2006.01)

(52) U.S. Cl.
  CPC ........... *H02M 3/337* (2013.01); *H02M 5/225* (2013.01); *H02M 7/538* (2013.01); *H02M 1/088* (2013.01); *H02M 7/49* (2013.01); *H02M 2001/0058* (2013.01)

(56) References Cited

U.S. PATENT DOCUMENTS

2018/0294668 A1*  10/2018  Li ........................... H01F 27/42
2019/0237971 A1*   8/2019  Inam ..................... H02J 3/1807
2019/0280586 A1*   9/2019  Chen ................. H02M 3/33576

OTHER PUBLICATIONS

H. Keyhani, H. A. Toliyat, M. Harfman-Todorovic, R. Lai and R. Datta, "An Isolated Resonant AC-Link Three-Phase AC-AC Converter Using a Single HF Transformer," in IEEE Transactions on Industrial Electronics, vol. 61, No. 10, pp. 5174-5183, Oct. 2014. (Year: 2014).*

M. Glinka and R. Marquardt, "A new AC/AC-multilevel converter family applied to a single-phase converter," The Fifth International Conference on Power Electronics and Drive Systems, 2003. PEDS 2003., Singapore, 2003, pp. 16-23 vol. 1. (Year: 2003).*

\* cited by examiner

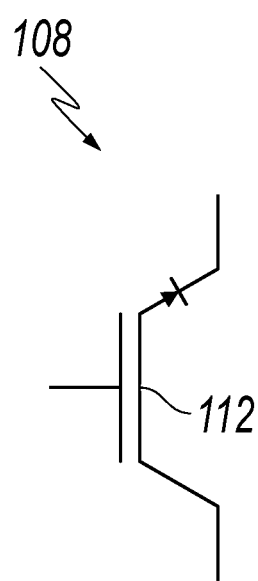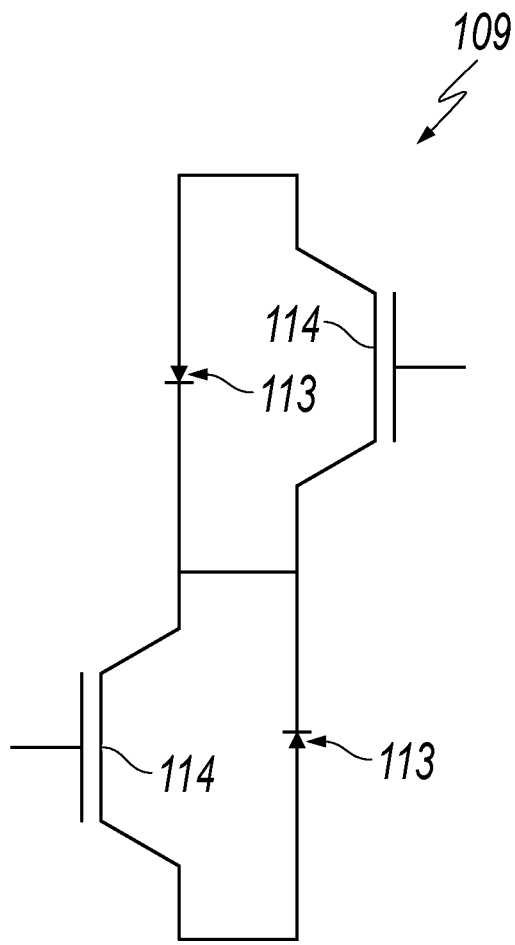
FIG. 1B
FIG. 1C

US 10,998,825 B2

METHOD AND APPARATUS FOR MEDIUM-VOLTAGE ELECTRONIC POWER CONVERSION

CROSS-REFERENCE TO RELATED APPLICATIONS

This application claims priority to U.S. Provisional Patent Application No. 62/629,446, filed on Feb. 12, 2018.

TECHNICAL FIELD

The present disclosure relates generally to conversion of at least one of voltage or frequency of a power source and more particularly, but not by way of limitation, to single-step transformation of at least one of voltage and frequency utilizing high-frequency transformers.

BACKGROUND

This section provides background information to facilitate a better understanding of the various aspects of the disclosure. It should be understood that the statements in this section of this document are to be read in this light, and not as admissions of prior art.

Conversion of one form of electric power to another is frequently required in various applications. For example, a particular application might require a frequency or a voltage of alternating current (AC) power to be adjusted. Additionally, various applications might require changing the voltage of direct current (DC) power. Finally, various applications might require changing AC power to DC power and vice versa. Many prior systems exist for effecting conversions of electric power. Most conventional systems, however, require a staged approach where, for example, a frequency is converted in a first stage and a voltage is converted in a second stage. Additionally, such prior power conversion systems often require large electrolytic capacitors which are ambient temperature sensitive and have a relatively short service life. Thus, a need exists for a single-stage power conversion system that offers galvanic isolation and soft switching.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

Various aspects of the disclosure relate to a power converter. The power converter includes a multiple-winding transformer. The multiple-winding transformer provides an electromagnetic link between an input side and an output side of the power converter. An inductor is arranged on at least one of the input side and the output side of the power converter in parallel with the multiple-winding transformer. At least one first capacitor is arranged on the input side of the power converter in parallel with the multiple-winding transformer and the inductor. At least one second capacitor is arranged on the output side of the power converter in parallel with the multiple-winding transformer. The inductor, the at least one first capacitor, and the at least one second capacitor define a parallel resonance tank. A first plurality of switching devices is arranged on the input side. A second plurality of switching devices is arranged on the output side.

Various aspects of the disclosure related to an isolated DC power converter. The isolated DC power converter includes a multiple-winding transformer. The multiple-winding transformer provides an electromagnetic link between an input side and an output side of the isolated DC power converter. A plurality of input switching devices is arranged on the input side of the isolated DC power converter. The input switching devices include a capacitor and a semiconductor switch.

Various aspects of the disclosure related to a method of power conversion, the method includes charging a parallel resonance tank with current from a first input phase pair and resonating the parallel resonance tank as a voltage of the parallel resonance tank decreases in magnitude. The parallel resonance tank is charged with current from a second input phase pair and the parallel resonance tank is resonated as the voltage of the parallel resonance tank changes polarity. The parallel resonance tank is discharged on a first output phase pair and the parallel resonance tank is resonated as link voltage increases in magnitude. The parallel resonance tank is discharged on a second output phase pair.

Various aspects of the disclosure related to a method of power conversion. The method includes charging a parallel resonance tank via switches in a first input leg and resonating the parallel resonance tank as a voltage of the parallel resonance tank changes polarity. The parallel resonance tank is discharged on a first output phase pair. The parallel resonance tank resonates as negative voltage of the parallel resonance tank increases in magnitude. The parallel resonance tank is discharged on a second output phase pair. The parallel resonance tank resonates as the negative voltage of the parallel resonance tank changes in magnitude.

BRIEF DESCRIPTION OF THE DRAWINGS

For a more complete understanding of the present disclosure and for further objects and advantages thereof, reference may now be had to the following description taken in conjunction with the accompanying drawings in which:

FIG. 1B is a circuit diagram of a first embodiment of a switching device according to an exemplary embodiment;

FIG. 1C is a circuit diagram of a second embodiment of a switching device according to an exemplary embodiment;

DETAILED DESCRIPTION

Various embodiments will now be described more fully with reference to the accompanying drawings. The disclosure may, however, be embodied in many different forms and should not be construed as limited to the embodiments set forth herein.

AC-AC Conversion

Figure 1A:
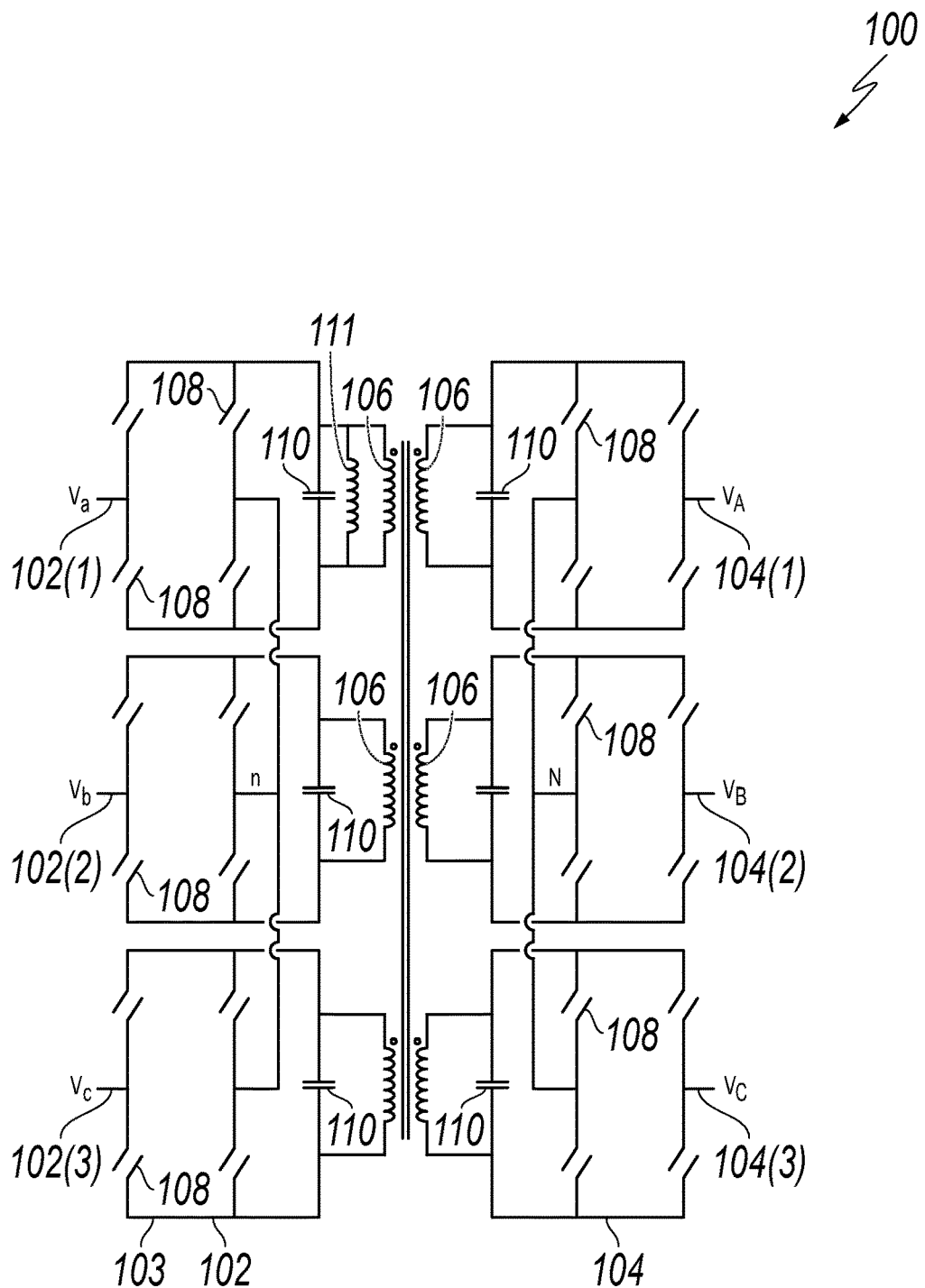
FIG. 1A is a circuit diagram of a three-phase buck boost AC-AC converter according to an exemplary embodiment.

FIG. 1A is a circuit diagram of a three-phase buck boost AC-AC converter 100. The three-phase AC-AC converter includes an input side 102 and an output side 104. The input side 102 includes three input phases 102(1), 102(2), 102(3) and the output side 104 includes three output phases 104(1), 104(2), 104(3). Each input phase 102(1)-(3) and each output phase 104(1)-(3) include a modular switch block 103. Each switch block 103 includes a plurality of switching devices 108 and is connected across a winding of a multiple winding transformer 106. In a typical embodiment, the multiple-winding transformer 106 provides galvanic isolation between the input phases 102(1), 102(2), 102(3) and the output phases 104(1), 104(2), 104(3). That is, no current travels directly from an input side 102 of the three-phase buck boost AC-AC converter 100 to an output side 104 of the three-phase buck boost AC-AC converter 100 and vice versa. In a typical embodiment, the plurality of switching devices 108 are arranged in an H-bridge. The switch block 103 includes capacitors 110, which may be either external or parasitic. In a typical embodiment, the capacitors 110 is rated at approximately a few tens or hundreds of nano-Farads, which is considerably smaller than capacitors utilized in conventional power-conversion applications, which could range from a few hundred micro-Farads to several thousand micro-Farads. In a typical embodiment, the decreased size of the capacitors 110 reduces the need for external heating or cooling systems for the three-phase buck boost AC-AC converter. In a typical embodiment, compared to conventional power-conversion applications, the three-phase buck boost AC-AC converter 100 exhibits a reduction factor of, for example, about half in the voltage stress on input and output switching devices 108. Voltage stress is defined as the maximum instantaneous voltage across the power terminals of a switch block 103. The capacitors 110 together with the inductor 111 form a parallel resonant tank that partially resonates during operation of the three-phase buck boost AC-AC converter 100. In a typical embodiment, the inductor 111 may be the magnetizing inductance of the multiple-winding transformer 106 or an external or parasitic inductor. By way of example, in FIG. 1, every switch block 103 is illustrated as including the capacitors 110; however, in other embodiments, the capacitors 110 may be omitted. The multiple-winding transformer 106 is illustrated by way of example in FIG. 1 as including six windings; however, in various other embodiments, any other arrangement of multiple-winding transformers may be utilized provided that a winding of each transformer is coupled to a winding of another transformer. Additionally, the input side 102 and output side 104 of the three-phase buck boost AC-AC converter 100 may be connected to a filter network such as a three-phase capacitive or capacitive/inductive filter.

Still referring to FIG. 1A, in various embodiments, the three-phase AC-AC converter 100 may accommodate an input frequency of approximately 50 Hz to approximately 60 Hz; however, in other embodiments, the three-phase AC-AC converter 100 may accommodate any input frequency as dictated by design requirements. In various embodiments, the three-phase AC-AC converter 100 produces an output voltage and an output frequency that may be either higher or lower than the input voltage and the input frequency as dictated by design requirements. In a typical embodiment, the three phase AC-AC converter 100 is reversible. That is, by way of example in FIG. 1, the left side of the three-phase AC-AC converter 100 has been illustrated to be the input side 102 and the right side of the three-phase AC-AC converter 100 has been illustrated to be the output side 104; however, in other embodiments, the right side could of the three-phase AC-AC converter 100 could operate as the input side and the left side of the three-phase AC-AC converter 100 could operate as the output side.

FIGS. 1B and 1C are circuit diagrams of the switching device 108. In a first embodiment, shown in FIG. 1B, the switching device 108 includes a bidirectional blocking semiconductor switching device 112 such as, for example, a reverse-blocking Insulated Gate Bipolar Transistor ("IGBT"), an IGBT in series with a diode, or a Metal-Oxide Semiconductor Field-Effect Transistor ("MOSFET") in series with a diode. In a second embodiment, shown in FIG. 1C, the switching device 108 can be any bidirectional blocking and conducting semiconductor switching device. For example, the bidirectional blocking and conducting semiconductor switching device 108 includes two single semiconductor switching devices 114 and two diodes 113. In a typical embodiment, the bidirectional blocking and conducting semiconductor switching device is utilized in applications involving higher power such as, for example, applications involving at least a few kilo-Watts to several hundred kilo-Watts. In a typical embodiment, the controlled operation of the switching device 108 allows for more efficient and softer switching with fewer losses in power.

Figure 2:
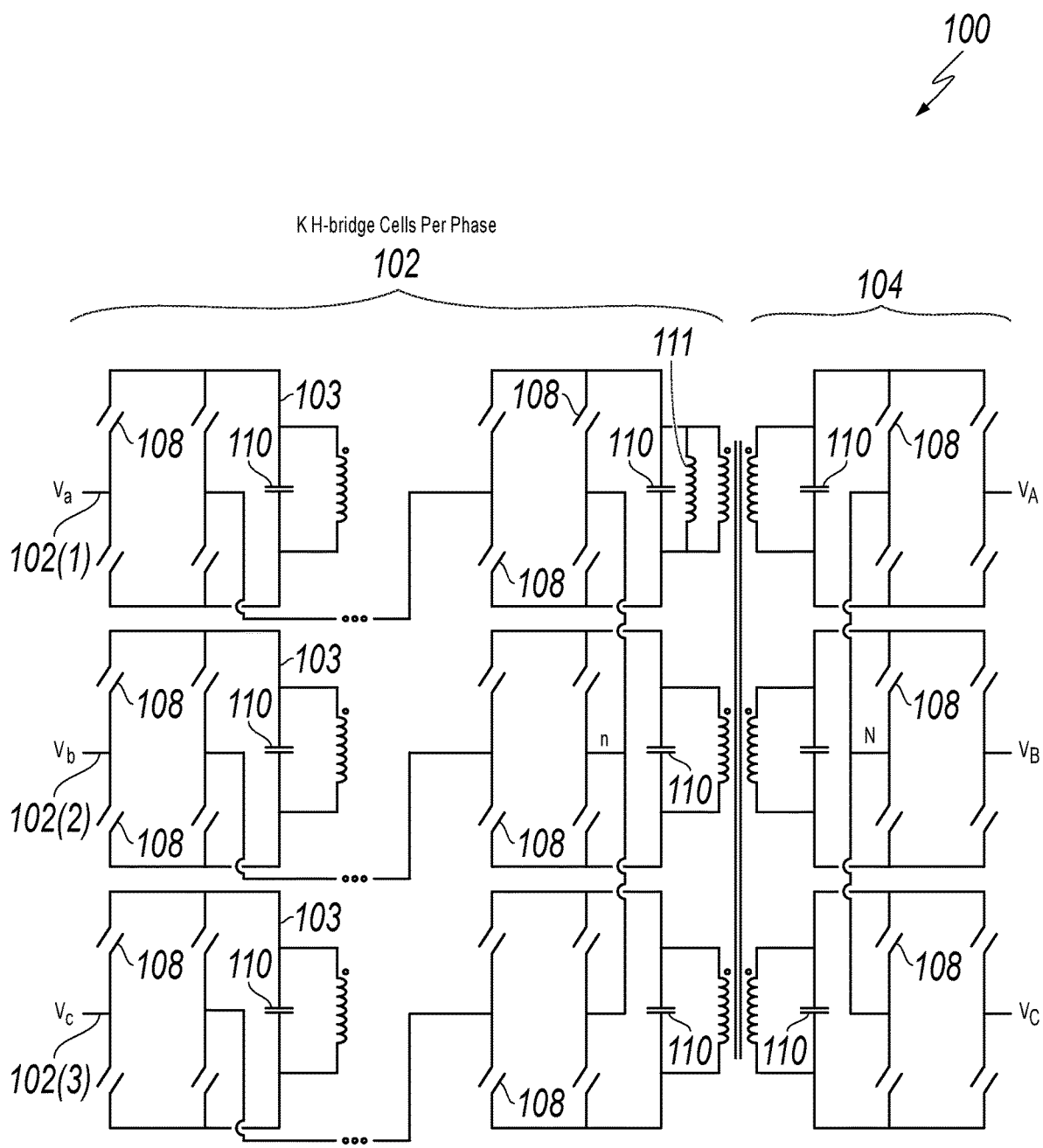
FIG. 2 is a circuit diagram of a cascaded three-phase buck boost AC-AC converter according to an exemplary embodiment.

FIG. 2 is a circuit diagram of a cascaded three-phase buck boost AC-AC converter 200. The cascaded three-phase AC-AC converter 200 is similar in construction to the three-phase AC-AC converter 100 discussed above with respect to FIG. 1A; however, the cascaded three-phase AC-AC converter 200 includes a plurality of serially-connected switch blocks 103 at each phase 102(1)-102(3) on the input side 102. By way of example, each input phase 102(1)-(3) is illustrated in FIG. 2 as including two switch blocks 103; however, in other embodiments, the input side phases 102(1)-(3) could utilize three or more switch blocks 103. FIG. 2 thus illustrates the modular nature of the switch blocks 103. In a typical embodiment, utilizing multiple switch blocks 103 and multiple windings per phase on the input side 102 allows the input side 102 to receive high input voltages while reducing stress on the switching devices 108 and capacitors 110 on the input side 102. In various embodiments, by using a greater number of switch blocks 103, the topology allows a proportionally higher voltage on the input side 102. Specifically, the cascaded three-phase AC-AC converter 200 exhibits a reduction factor of about ½K in the voltage stress on the switching device 108 and capacitors 110, where K is the number of switch H-Bridge blocks 103 in an input phase 102(1)-102(3). In a typical embodiment, the three phase AC-AC converter 200 is reversible. That is, by way of example in FIG. 2, the left side of the three-phase AC-AC converter 200 has been illustrated to be the input side 202 an the right side of the three-phase AC-AC converter 200 has been illustrated to be the output side 204; however, in other embodiments, the right side of the three-phase AC-AC converter 200 could operate as the input side and the left side of the three-phase AC-AC converter 200 could operate as the output side. Similar to FIG. 1, the capacitors 110 together with the inductor 111 form a parallel resonant tank that partially resonates during operation of the three-phase buck boost AC-AC converter 200. In a typical embodiment, the inductor 111 may be the magnetizing inductance of the multiple-winding transformer 106 or an external or parasitic inductor. By way of example, in FIG. 2, every switch block 103 is illustrated as including the capacitors 110; however, in other embodiments, the capacitors 110 may be omitted. The multiple-winding transformer is illustrated by way of example in FIG. 2 as including several windings; however, in various other embodiments, any other arrangement of multiple-winding transformers may be utilized provided that a winding of each transformer is coupled to a winding of another transformer. Additionally, the input and output terminals of the three-phase buck boost AC-AC converter 200 may be connected to a filter network such as a three-phase capacitive or capacitive/inductive filter.

Figure 3:
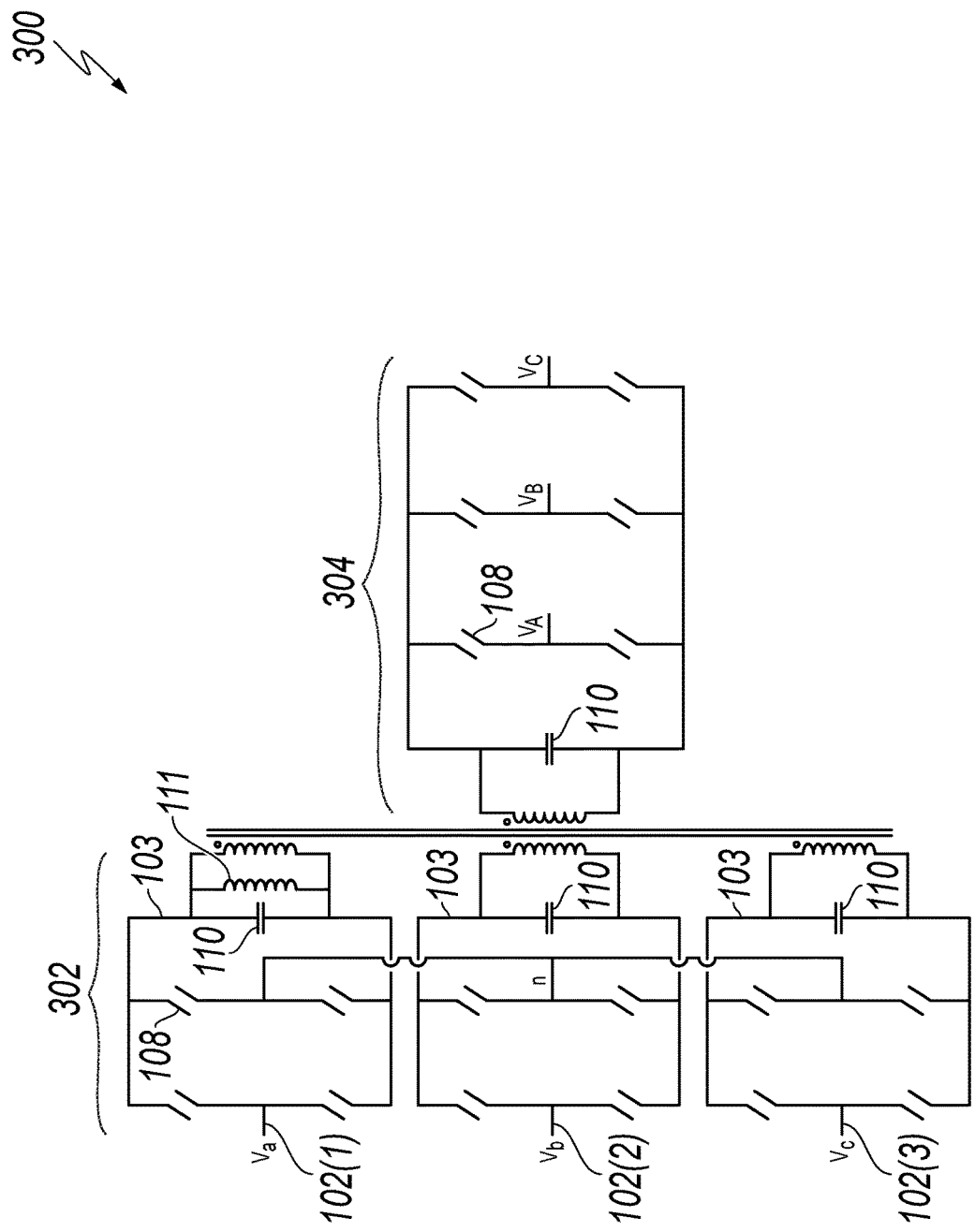
FIG. 3 is a circuit diagram of a three-phase buck boost AC-AC converter having three H-bridges according to an exemplary embodiment.

FIG. 3 is a circuit diagram of a three-phase buck boost AC-AC converter 300 having three H-bridges 103. The three-phase AC-AC converter 300 includes a switch block 103 at each input phase 102(1)-(3). On an output side 304, the three-phase AC-AC converter 300 utilizes a three-leg configuration. In a typical embodiment, the switching devices 108 are similar to the switching devices 108 discussed above with respect to FIGS. 1-2. In a typical embodiment, when compared to conventional power-conversion systems, the three-phase buck boost AC-AC converter 300 exhibits a reduction factor of about half in the voltage stress on the input switching devices 108. In a typical embodiment, use of the switch blocks 103 reduces stress on the switching devices 108. In a typical embodiment, the three-phase AC-AC converter 300 is reversible. That is, by way of example in FIG. 3, the left side of the three-phase AC-AC converter 300 has been illustrated to be the input side 302 an the right side of the three-phase AC-AC converter 300 has been illustrated to be the output side 304; however, in other embodiments, the right side of the three-phase AC-AC converter 300 could operate as the input side and the left side of the three-phase AC-AC converter 300 could operate as the output side. Other advantages over conventional power conversion systems include input current shaping, high efficiency, no use of a bulky electrolytic capacitor, isolation through a high-frequency transformer, and higher reliability in the event of component failure. Similar to FIG. 1, the capacitors 110 together with the inductor 111 form a parallel resonant tank that partially resonates during operation of the three-phase buck boost AC-AC converter 300. In a typical embodiment, the inductor 111 may be the magnetizing inductance of the multiple-winding transformer 106 or an external or parasitic inductor. By way of example, in FIG. 3, every switch block 103 is illustrated as including the capacitors 110; however, in other embodiments, the capacitors 110 may be omitted. The multiple-winding transformer is illustrated by way of example in FIG. 3 as including several windings; however, in various other embodiments, any other arrangement of multiple-winding transformers may be utilized provided that a winding of each transformer is coupled to a winding of another transformer. Additionally, the input and output terminals of the three-phase buck boost AC-AC converter 300 may be connected to a filter network such as a three-phase capacitive or capacitive/inductive filter.

Figure 4:
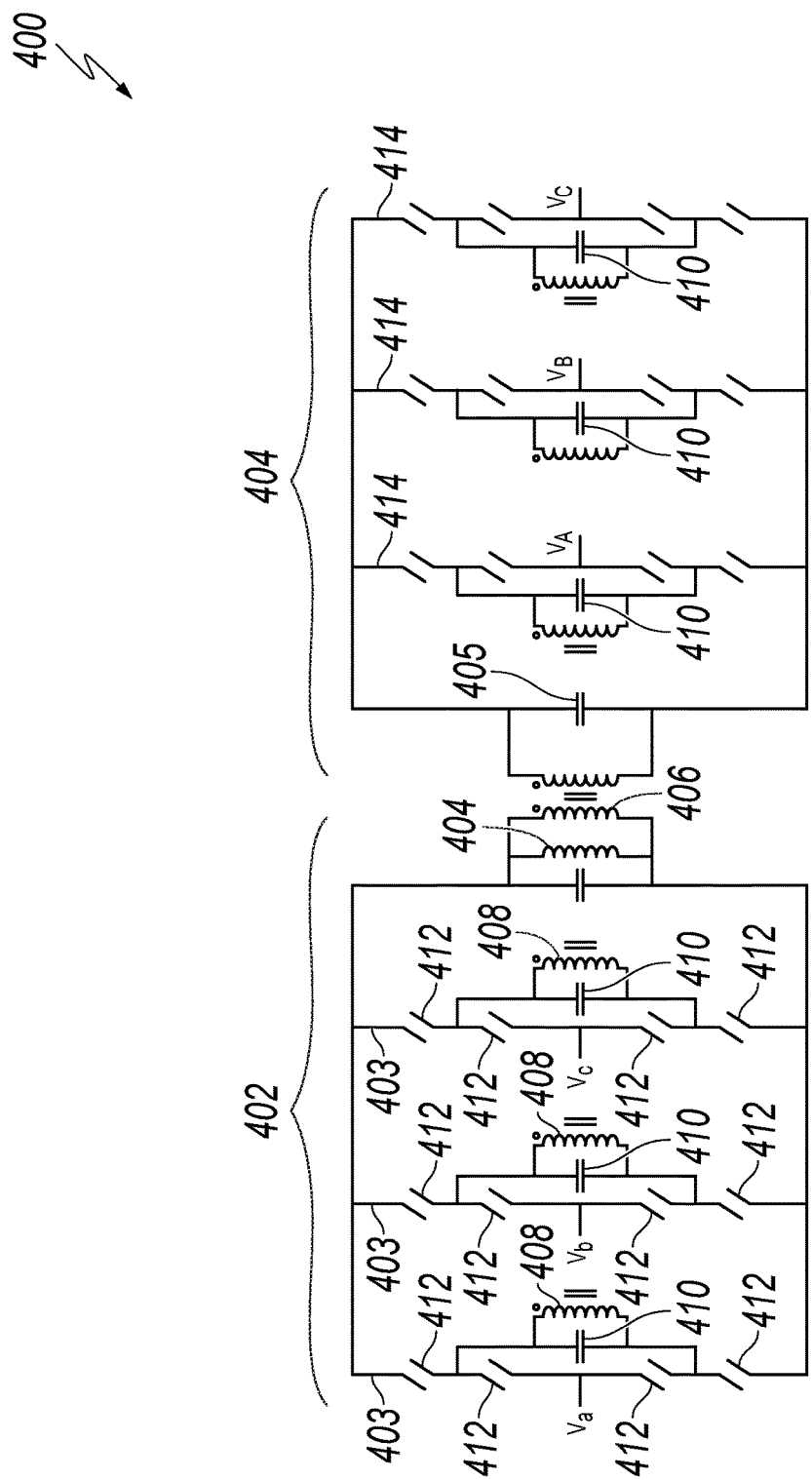
FIG. 4 is a circuit diagram of a three-phase buck boost AC-AC converter having two main windings and six auxiliary windings according to an exemplary embodiment.

FIG. 4 is a circuit diagram of a three-phase AC-AC converter 400. The three-phase AC-AC converter includes an input side 402 and an output side 404. The three-phase AC-AC converter 400 also includes a multiple-winding transformer 406 disposed between the input side 402 and the output side 404. In a typical embodiment, the multiple-winding transformer 406 provides transfer of power between the input side 402 and the output side 404 while maintaining galvanic isolation between the input side 402 and the output side 404. That is, no electrical current passes from the input side 402 to the output side 404 and vice versa.

Still referring to FIG. 4, the input side includes input legs 403. One input leg 403 corresponds to each phase on the input side 402 of the three-phase AC-AC converter 400. Each input leg 403 includes an auxiliary transformer winding 408, capacitors 410, and a plurality of switching devices 412. In a typical embodiment, the switching devices 412 are similar to the switching devices 108 discussed above with respect to FIGS. 1-3. By way of example, the three-phase AC-AC converter 400 illustrates four switching devices 412 on each input leg 403; however, in other embodiments, the number of switching devices 412 per input leg 403 may vary as dictated by design requirements as shown, for example, in FIG. 5 discussed below. In a typical embodiment, the capacitors 410 is rated at approximately a few tens or hundreds of nano-Farads, which is considerably smaller than capacitors utilized in conventional power-conversion applications, which could range from a few hundred micro-Farads to several thousand micro-Farads. In a typical embodiment, the decreased size of the capacitors 410 reduces the need for external heat sinks or cooling systems for the three-phase AC-AC converter. Capacitors 410 and 405 can be external or parasitic. The capacitors 410 and 405 together with the inductor 411 form a parallel resonant tank that partially resonates during operation of the three-phase buck boost AC-AC converter 400. In a typical embodiment, the inductor 411 may be the magnetizing inductance of the multiple-winding transformer 406 or an external or parasitic inductor. By way of example, in FIG. 4, each winding 407, 408 is illustrated as being connected in parallel to the capacitors 410; however, in other embodiments, this is not the case. The multiple-winding transformer is illustrated by way of example in FIG. 4 as including several windings; however, in various other embodiments, any other arrangement of multiple-winding transformers may be utilized provided that a winding of each transformer is coupled to a winding of another transformer. Additionally, the input and output terminals of the three-phase buck boost AC-AC converter 400 may be connected to a filter network such as a three-phase capacitive or capacitive/inductive filter.

Still referring to FIG. 4, the output side 404 includes an output leg 414. One output leg 414 corresponds to each output phase on the output side 404 of the three-phase AC-AC converter 400. In a typical embodiment, the output leg 414 is constructed similar to the input leg 403. In a typical embodiment, when compared to conventional power-conversion systems, the three-phase buck boost AC-AC converter exhibits a reduction factor of about half in the voltage stress on the input side and the output side of the semiconductors. In a typical embodiment, the power flow in the three phase AC-AC converter 400 is reversible.

Figure 5:
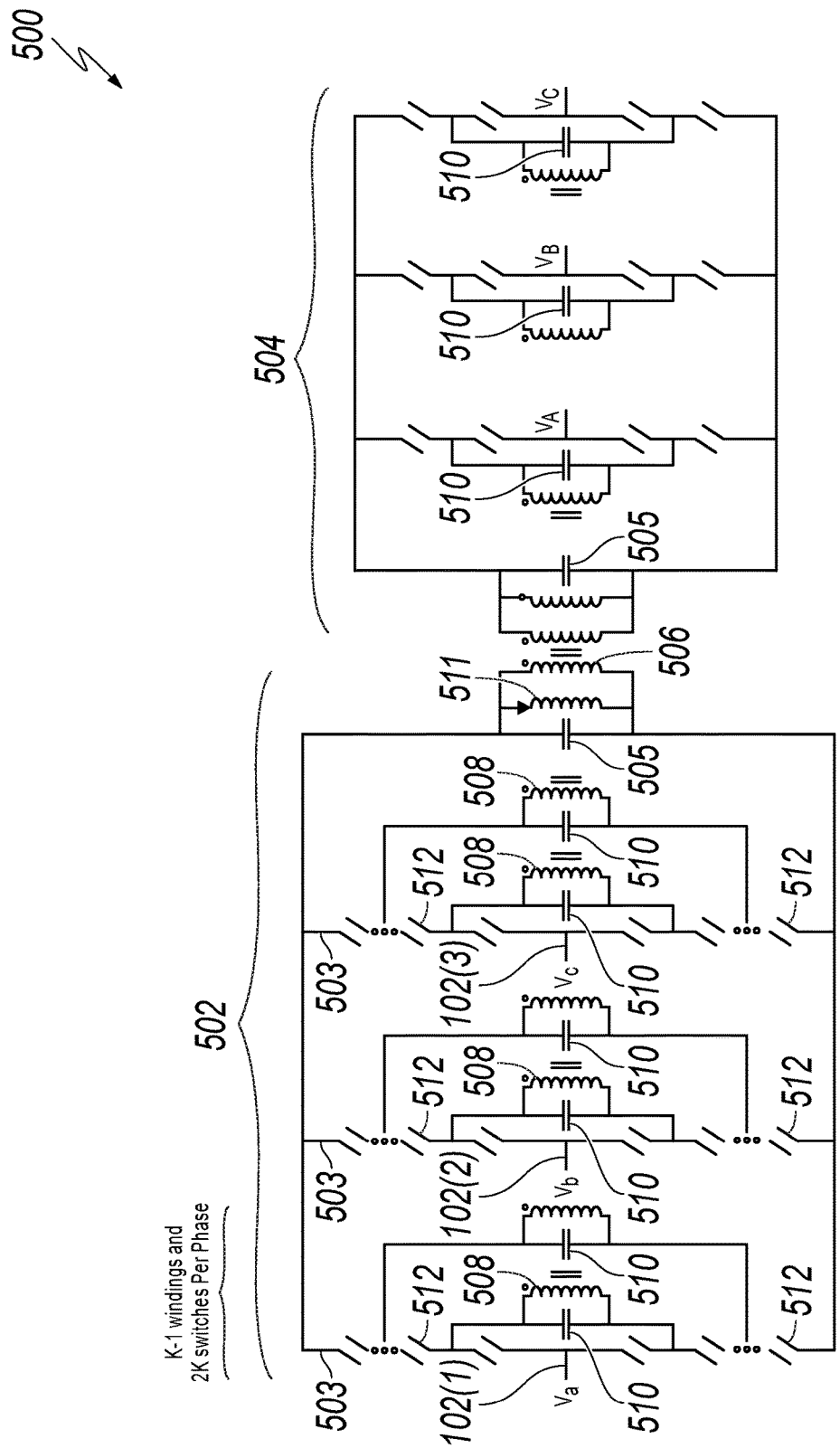
FIG. 5 is a circuit diagram of a three-phase buck boost AC-AC converter according to an exemplary embodiment.

FIG. 5 is a circuit diagram of a three-phase buck boost AC-AC converter 500. The three-phase AC-AC converter 500 includes an input side 502 and an output side 504. In a typical embodiment, the output side 504 is similar in construction to the output side 404 discussed above with respect to FIG. 4. The three-phase AC-AC converter 500 also includes a multiple-winding transformer 506 disposed between the input side 502 and the output side 504. In a typical embodiment, the multiple-winding transformer 506 provides transfer of power between the input side 502 and the output side 504 while maintaining galvanic isolation between the input side 502 and the output side 504. That is, no electrical current passes from the input side 502 to the output side 504 or vice versa. The capacitors 510 and 505, together with the inductor 511, form a parallel resonant tank that partially resonates during operation of the three-phase buck boost AC-AC converter 500.

Still referring to FIG. 5, the input side includes an input leg 503. One input leg 503 corresponds to each input phase on the input side 502 of the three-phase AC-AC converter 500. Each input leg 503 includes at least two auxiliary transformer windings 508, at least two capacitors 510, and a plurality of switching devices 512. In a typical embodiment, the switching devices 512 are similar to the switching devices 108 discussed above with respect to FIGS. 1-3. By way of example, the three-phase AC-AC converter 500 illustrates six switching devices 512 on each input leg 503; however, in other embodiments, the number of switching devices 512 per input leg 403 may vary as dictated by design requirements. In a typical embodiment, with 2K switching devices 512, K−1 auxiliary transformer windings 508, and K−1 capacitors 510 in each input leg 503, the three-phase buck boost AC-AC converter 500 exhibits a reduction factor of 1/K and ½ in the voltage stress on the input side and output side semiconductors, respectively when compared to convention power-conversion systems. In a typical embodiment, the capacitors 510 is rated at approximately a few hundred nano-farads, which is considerably smaller than capacitors utilized in conventional power-conversion applications which could range from a few hundred micro-Farads to several thousand micro-Farads. In a typical embodiment, the three phase AC-AC converter 500 is reversible. That is, by way of example in FIG. 5, the left side of the three-phase AC-AC converter 500 has been illustrated to be the input side 502 an the right side of the three-phase AC-AC converter 500 has been illustrated to be the output side 504; however, in other embodiments, the right side could of the three-phase AC-AC converter 500 could operate as the input side and the left side of the three-phase AC-AC converter 500 could operate as the output phase.

Other advantages over conventional power conversion systems include input current shaping, high efficiency, use of no bulky electrolytic capacitor, and isolation through a high-frequency transformer, and higher reliability in the event of component failure. Capacitors 510 and 505 can be external or parasitic. The capacitors 510 and 505 together with the inductor 511 form a parallel resonant tank that partially resonates during operation of the three-phase buck boost AC-AC converter 500. In a typical embodiment, the inductor 511 may be the magnetizing inductance of the multiple-winding transformer 106 or an external or parasitic inductor. By way of example, in FIG. 5, each winding 507, 508 is illustrated as being connected in parallel to the capacitors 510 or 505; however, in other embodiments, this is not the case. The multiple-winding transformer is illustrated by way of example in FIG. 5 as including several windings; however, in various other embodiments, any other arrangement of multiple-winding transformers may be utilized provided that a winding of each transformer is coupled to a winding of another transformer. Additionally, the input and output terminals of the three-phase buck boost AC-AC converter 500 may be connected to a filter network such as a three-phase capacitive or capacitive/inductive filter.

Figure 6:
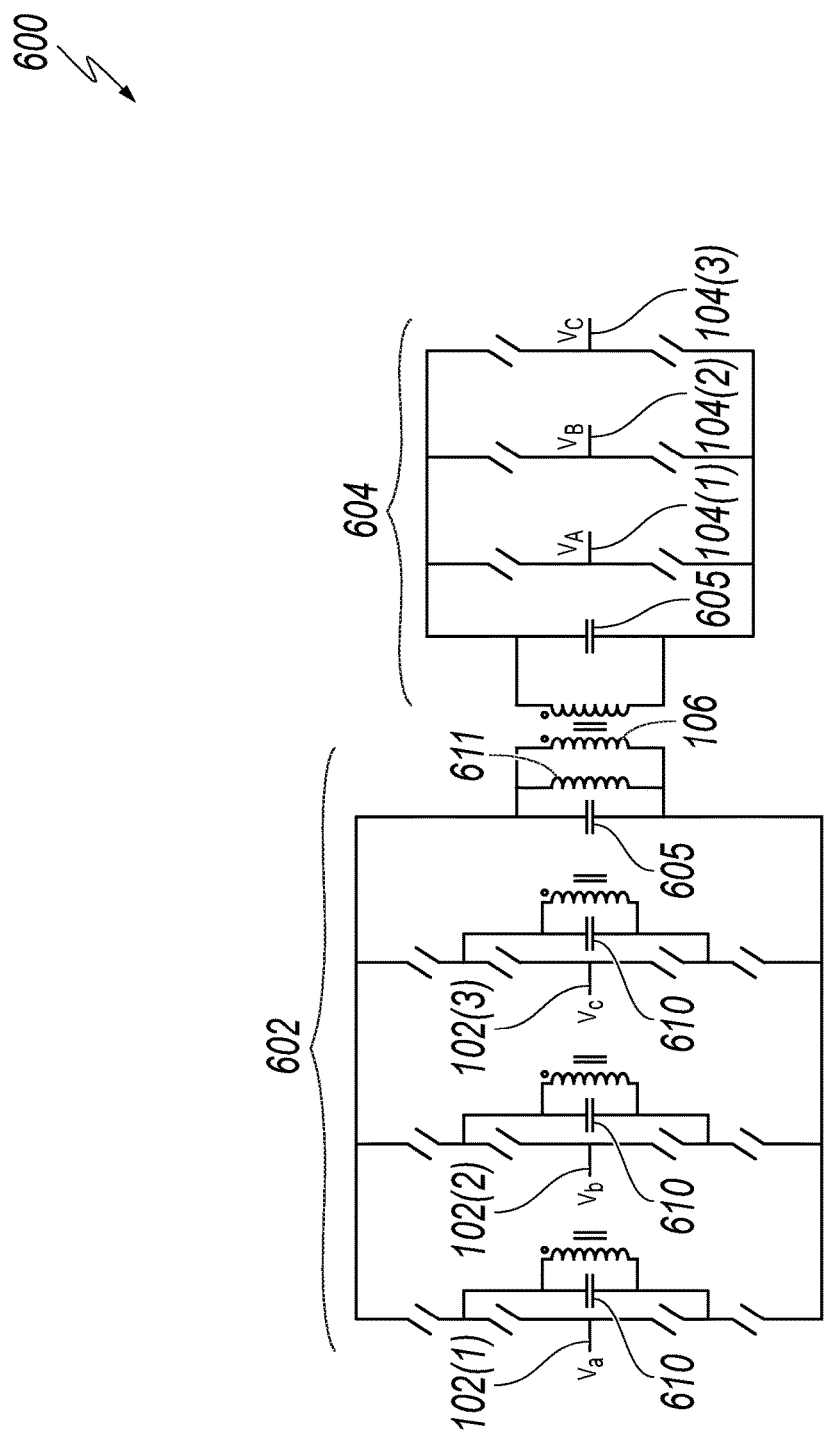
FIG. 6 is a circuit diagram of a three-phase buck boost AC-AC converter according to an exemplary embodiment.

FIG. 6 is a circuit diagram of a three-phase buck boost AC-AC converter 600. The three phase AC-AC converter 600 includes an input side 602 and an output side 604. The input side 602 is similar in construction to the input side 402 discussed above with respect to FIG. 4. The output side is similar to the output side 304 discussed above with respect to FIG. 3. In a typical embodiment, the three-phase AC-AC converter 600 is able to interface a higher voltage source to a lower voltage source and vice versa due to the fact that the input side has a plurality of four switching devices and an auxiliary transformer winding in each leg. In a typical embodiment, the three phase AC-AC converter 600 is reversible. That is, by way of example in FIG. 6, the left side of the three-phase AC-AC converter 600 has been illustrated to be the input side 602 an the right side of the three-phase AC-AC converter 600 has been illustrated to be the output side 604; however, in other embodiments, the right side of the three-phase AC-AC converter 600 could operate as the input side and the left side of the three-phase AC-AC converter 600 could operate as the output side and vice versa. All capacitors can be external or parasitic. The capacitors 610 and 605 together with the inductor 611 form a parallel resonant tank that partially resonates during operation of the three-phase buck boost AC-AC converter 600. In a typical embodiment, the inductor 611 may be the magnetizing inductance of the multiple-winding transformer 106 or an external or a parasitic inductor. By way of example, in FIG. 6, each winding is illustrated as being connected in parallel to the capacitor; however, in other embodiments, this is not the case. Additionally, the input and output terminals of the three-phase buck boost AC-AC converter 600 may be connected to a filter network such as a three-phase capacitive or capacitive/inductive filter.

Operation of converters of FIGS. 1-6

In reference to AC-AC converters of FIGS. 1-6, as stated before, each converter has a parallel resonant tank (hereinafter referred to as the link) that partially resonates during the converter's operation. The link in these converters transfers energy by charging from the selected input phase pair and discharging into the selected output phase pairs. The link current and voltage are hereinafter referred to as the link current and link voltage, respectively. Depending on the choice of first or second embodiment for the converters (bidirectional blocking switching devices such as FIG. 1B, or bidirectional blocking and conducing semiconductor devices such as FIG. 1C), each link cycle is comprised of eight or sixteen operating modes as elaborated in the rest of this section. By no way of limitation and for the sake of brevity and simplicity of naming conventions, it is assumed that components are ideal. By no way of limitation, it is assumed that there are capacitive filters connected to the input and output terminals of the converters. There are periods when all semiconductor switches are in their blocking mode and the link is not connected to either of the terminals, and therefore is allowed to resonate until the link voltage meets certain requirements. The resonant periods provide zero-voltage switching for every switch turn-on transition, and provide a reduced rate of voltage rise on the semiconductors at turn-off transitions.

FIGS. 11-16 and the corresponding paragraphs describe the operation of the converters of FIGS. 1-6. Due to similarities between converters of FIGS. 1 and 2, only FIG. 11 is depicted. Also, due to similarities between converters of FIGS. 4 and 5, only FIG. 13 is depicted. For purposes of discussion, the modes of operation shown in FIGS. 11-16 will be described relative to FIGS. 11A-11E; however, one skilled in the art will understand that the principles of operation described below also apply to FIGS. 12-16.

In the first embodiment of converters of FIG. 1-6 i.e., with bidirectional blocking switching devices 112, as shown in FIG. 1B, each link cycle is comprised of 8 modes. Two modes charge the link from the input, and two modes discharge the link into the output. Partial resonance happens at the remaining four modes (even-numbered modes). By no way of limitation, unity power factor is assumed at the input terminals. In various embodiments, in a three-phase application, the current reference may be a set of desired sinusoidal currents for the three phases.

Figure 15:
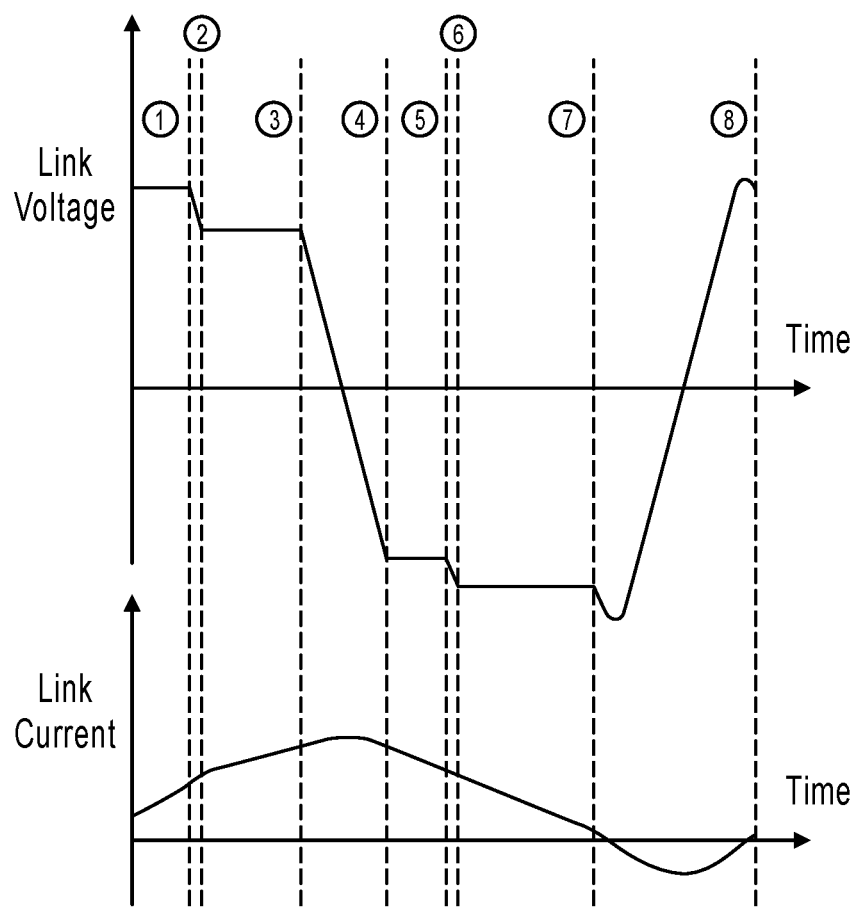
FIG. 15 is a plot of link voltage and link current versus time illustrating eight modes of operation of AC-AC conversion according to an exemplary embodiment.

Mode 1: The link charges with positive current through the two input phases 102(1)-102(3) whose current reference difference (and therefore voltage difference) has the largest magnitude. FIGS. 11A, 12A, 13A and 14A shows an example of mode 1. The thick lines in FIG. 11-16 show the path and switches that link current goes through. In these figures, phases a and b current references have the largest difference and are selected to carry current. Input phases a and b 102(1) and 102(2) in these figures have positive and negative current references, respectively, therefore the switches 108 in thick lines are selected to carry current. In case the current references of phases a and b were negative and positive respectively, then opposite switches of phase a and b would conduct to have positive current in the link. Assuming that the link frequency is much higher than the input frequency, the voltage on the link in this mode is almost constant and the link current increases almost linearly, as shown in FIG. 15. This mode goes on until one of the phases in the input pair meets a current reference for the input phase. In various embodiments, the current reference of a phase is considered to be met when the current into or out of the phase, averaged over one link cycle, equals the current reference of the same phase.

Mode 2: None of the switches 108 conduct. The link resonates as its voltage drops in magnitude, as shown in FIG. 15. The path of link current is shown in thick lines in FIGS. 11B, 12B, 13B, and 14B. At the instant when the link voltage matches the input phase pair whose current reference difference has the second highest magnitude of all, the switches 108 on that input phase pair start conducting. Similar to mode 1, switches 108 in the conducting phase pair should be selected in a way that the polarity of current in the conducting phases matches their references and positive current flows through the link. For example, FIGS. 11C, 12C, 13C, and 14C show conducting switches for the case where input phases a and c 102(1) and 102(3) have positive and negative current references, respectively. Voltage on the conducting switches 108 at the instant they turn on is zero. This results in zero-voltage at turn-on and significantly reduces switching losses.

Mode 3: The selected input phase pair from mode 2 charges the link with positive current, as shown in FIG. 15. This mode goes on until the conducting phases meet their current reference. This should happen at the same time on both phases since phase current references sum to zero at every instant. Soft switching at turn-off is achieved because the winding capacitors and the input filter capacitors limit the rate of rise of voltage on the switches. The same phenomenon happens at the end of mode 1 as well. At the end of mode 3 all switches 108 are gated off.

Mode 4: No switches 108 carry current in this mode, therefore the link resonates and link voltage changes polarity, as shown in FIG. 15. The path of current is shown in FIGS. 11B, 12B, 13B, and 14B. On the output side, out of the three output phase pairs AB, BC, and AC, the two pairs which accommodate the phase with the largest current reference magnitude are candidates for conduction in mode 5. Out of these two pairs, the one with the smaller voltage difference magnitude is selected for mode 5, and the other is selected for conduction in mode 7. This leads to a descending voltage sequence as shown in FIG. 15, which is in essence having zero-voltage turn-on. Switches 108 corresponding to the chosen pair start conducting only when the reflected link voltage through the transformer turns ratio matches the pair voltage difference causing the voltage across the about-to-conduct switches to be zero. As in mode 2, this results in zero-voltage turn-on for all conducting switches.

Mode 5: The link is discharged on the output pair and its current reduces almost linearly as shown in FIG. 15. Switches 108 in the conducting phase pair should be selected in a way that the polarity of current in the conducting phases matches their references and the positive link current ramps down. For example, FIGS. 11D, 12D, 13D, and 14D show the path and the conducting switches for the case where phase pair AB conducts. Current references for phases A and B in FIGS. 11D, 12D, 13D, and 14D is positive and negative, respectively. This mode continues until one of the phases in the pair, namely the phase with the smaller current reference, meets its current reference. At this moment the switches 108 are gated off and mode 5 ends.

Mode 6: No switches 108 carry current and the link resonates as shown in FIG. 15. The negative link voltage increases in magnitude, until it equals the reflected voltage difference of the selected output pair for mode 7 causing the voltage across the about-to-conduct switches to be zero. Thus, zero-voltage switching at turn-on is achieved. At this point, the switches 108 corresponding to the pair start conducting to carry the positive link current. Selection of a proper phase pair for mode 7 was explained above in the discussion of mode 5. Similar to other resonant modes, zero-voltage switching at turn-on is achieved.

Mode 7: The selected output pair 104(1)-104(3) discharges the link, as shown in FIG. 15. Similar to mode 5, switches 108 in the conducting phase pair should be selected in a way that the polarity of current in the conducting phases matches their references and the positive link current ramps down. For example, FIGS. 11E, 12E, 13E, and 14E show the path and the conducting switches 108 for the case where phase pair AC conducts. Current references for phases A and B in FIGS. 11D, 12D, 13D, and 14D is positive and negative, respectively. This mode continues until the energy in the link drops to a pre-determined level $E_{desired}$. This will be elaborated in a later section. This mode ends by turning all switches 108 off.

Mode 8: No switches 108 carry current in this mode. With the left-over energy from mode 7 the link resonates and the link voltage goes positive, as shown in FIG. 15. At this point, the link current changes direction. This mode ends when the link voltage equals the input phase pair with the largest current reference difference. The proper switches 108 on the input are gated on at zero voltage to prepare the converter for mode 1.

Selection of $E_{desired}$: It was mentioned earlier in description of modes that the requirement to end mode 7 is to have the energy left in the link reduced to a desired level, $E_{desired}$. This condition guarantees that the same amount of energy that was delivered to the link in modes 1 and 3, is taken from the link in modes 5 and 7, thereby indirectly balancing the input and output powers. Since $E_{desired}$ is the link energy content, it also determines the link peak voltage in mode 8. While using $E_{desired}$ as criteria is an effective way to end mode 7, it is not the only way and it is just one of many ways to end mode 7.

In the second embodiment of converters of FIG. 1-6 i.e., with bidirectional blocking and conducting switching devices 108, shown above in FIG. 1C, each link cycle is comprised of 16 modes. Four modes charge the link from the input, and four modes discharge the link into the output. Partial resonance happens at the remaining eight modes (even-numbered modes). By no way of limitation, unity power factor is assumed at the input terminals. In various embodiments, the current references may be a set of desired sinusoidal currents for the three phases.

Figure 16:
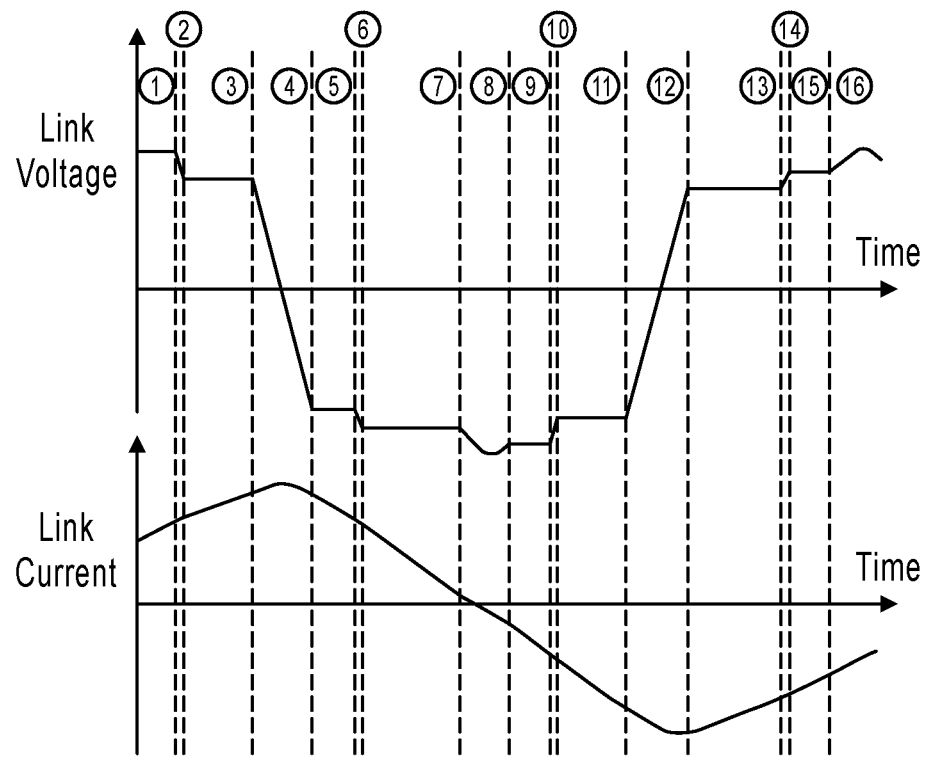
FIG. 16 is a plot of link voltage and link current versus time illustrating sixteen modes of operation of AC-AC conversion according to an exemplary embodiment.

Mode 1: The link charges with positive current through the two input phases 102(1)-102(3) whose current reference difference (and therefore voltage difference) have the biggest magnitude. FIGS. 11A, 12A, 13A, and 14A show examples of mode 1. The thick lines in FIG. 11-16 show the path and switches that the link current goes through. In these figures, input phases a and b 102(1) and 102(2) current references have the largest difference and are selected to carry current. Input phases a and b 102(1) and 102(2) in these figures have positive and negative current references, respectively, therefore the switches shown in thick lines are selected to carry current. In case the current references of phases a and b were negative and positive, respectively, then opposite switches 108 of input phase a and b 102(1) and 102(2) would conduct to have positive current in the link. Assuming that the link frequency is much higher than the input frequency, the voltage on the link in this mode is almost constant and the link current increases almost linearly, as shown in FIG. 16. This mode goes on until one of the phases in the input pair meets its current reference. In various embodiments, the current reference of a phase is considered met when the current into or out of the phase, averaged over one or half of a link cycle, equals the current reference of the same phase.

Mode 2: None of the switches 108 conduct. The link resonates and the link voltage drops in magnitude, as shown in FIG. 16. The path of current is showed in thick lines in FIGS. 11B, 12B, 13B, and 14B. At the instant when the link voltage matches the input phase pair whose current reference difference has the second highest magnitude of all, the switches 108 on that pair start conducting Similar to mode 1, switches in the conducting phase pair should be selected in a way that the polarity of current in the conducting phases matches their references and positive current flows through the link. For example, FIGS. 11C, 12C, 13C, and 14C show conducting switches 108 for the case where input phases a and c 102(1) and 102(3) have positive and negative current references, respectively. Voltage on the conducting switches 108 at the instant they turn on is approximately zero. This results in zero-voltage at turn-on and significantly reduces switching losses.

Mode 3: The selected input phase pair from mode 2 charges the link with positive current, as shown in FIG. 16. This mode goes on until the conducting phases meet their current reference. This should happen at the same time on both phases since phase current references sum to zero at every instant. Soft switching at turn-off is achieved because the capacitors of the resonance tank and the input filter capacitors (not shown in the drawings) limit the rate of rise of voltage on the switches. The same phenomenon happens at the end of mode 1 as well. At the end of mode 3, all switches are gated off.

Mode 4: No switches 108 carry current in this mode; therefore the link resonates and the link voltage changes polarity, as shown in FIG. 16. The path of current is shown in FIGS. 11B, 12B, 13B, and 14B. On the output side, out of the three output phase pairs AB, BC, and AC, the two pairs which accommodate the phase with the largest current reference magnitude are candidates for conduction in mode 5. Out of these two pairs, the one with the smaller voltage difference magnitude is selected for mode 5, and the other is selected for conduction in mode 7. This leads to a descending voltage sequence as shown in FIG. 16, which is in essence having zero-voltage turn-on. Switches 108 corresponding to the chosen pair start conducting only when the reflected link voltage through the transformer turns ratio matches the pair voltage difference. As in mode 2, this ensures zero-voltage turn-on for all conducting switches 108.

Mode 5: The link is discharged on the output pair and its current reduces almost linearly as shown in FIG. 16. Switches 108 in the conducting phase pair should be selected in a way that the polarity of current in the conducting phases matches their references and the positive link current ramps down. For example, FIGS. 11D, 12D, 13D, and 14D show the path and the conducting switches 108 for the case where phase pair AB conducts. Current references for phases A and B 104(1)-104(2) in FIGS. 11D, 12D, 13D, and 14D is positive and negative, respectively. This mode continues until one of the phases in the pair, namely the phase with the smaller current reference, meets its current reference. At this moment, the switches 108 are gated off and mode 5 ends.

Mode 6: No switches 108 carry current and the link resonates as shown in FIG. 16. The negative link voltage increases in magnitude, until it equals the reflected voltage difference of the selected output pair for mode 7. At this point, the switches 108 corresponding to the pair start conducting to carry the positive link current. Selection of a proper phase pair for mode 7 was explained above in the discussion of mode 5. Similar to other resonant modes, zero-voltage switching at turn-on is achieved.

Mode 7: The selected output pair discharges the link, as shown in FIG. 16. Similar to mode 5, switches in the conducting phase pair should be selected in a way that the polarity of current in the conducting phases matches their references and the positive link current ramps down. For example, FIGS. 11E, 12E, 13E, and 14E show the path and the conducting switches for the case where phase pair AC conducts. Current references for phases A and B in FIGS. 11D, 12D, 13D, and 14D is positive and negative, respectively. This mode continues until the energy in the link drops to a pre-determined level $E_{desired}$. This will be elaborated in a later section. This mode ends by turning all switches 108 off.

Mode 8: No switches 108 carry current in this mode. With the left-over energy from mode 7 the link resonates and the negative link voltage grows in magnitude to have its peak, as shown in FIG. 16. At this point the link current changes direction. This mode ends when the link voltage equals the input phase pair with the largest current reference difference. The proper switches 108 on the input are gated on at zero voltage to prepare the converter for mode 9.

As shown in FIG. 16, modes 9-16 follow essentially the same concept set forth in the discussion of modes 1-8. However, the link current and voltage have reversed polarities as compared to modes 1-8. In modes 9-16, the link current experiences its negative half cycle. This allows bipolar utilization of the magnetic device and makes the converter capable of transferring power through both polarities of the link current, as is the case for all "double-ended" converters.

Selection of $E_{desired}$: It was mentioned earlier in description of modes that the requirement to end mode 7 (and 15) is to have the energy left in the link reduced to a desired level, $E_{desired}$. This condition guarantees that the same amount of energy that was delivered to the link in modes 1 and 3 (and 9 and 11), is taken from the link in modes 5 and 7 (and 13 and 15), thereby indirectly balancing the input and output powers. Since $E_{desired}$ is the link energy content, it also determines the link peak voltage in mode 8 (and 16). While using $E_{desired}$ as criteria is an effective way to end mode 7 (and 15), it is not the only way and it is just one of many ways to end mode 7.

DC-DC Conversion

Figure 7:
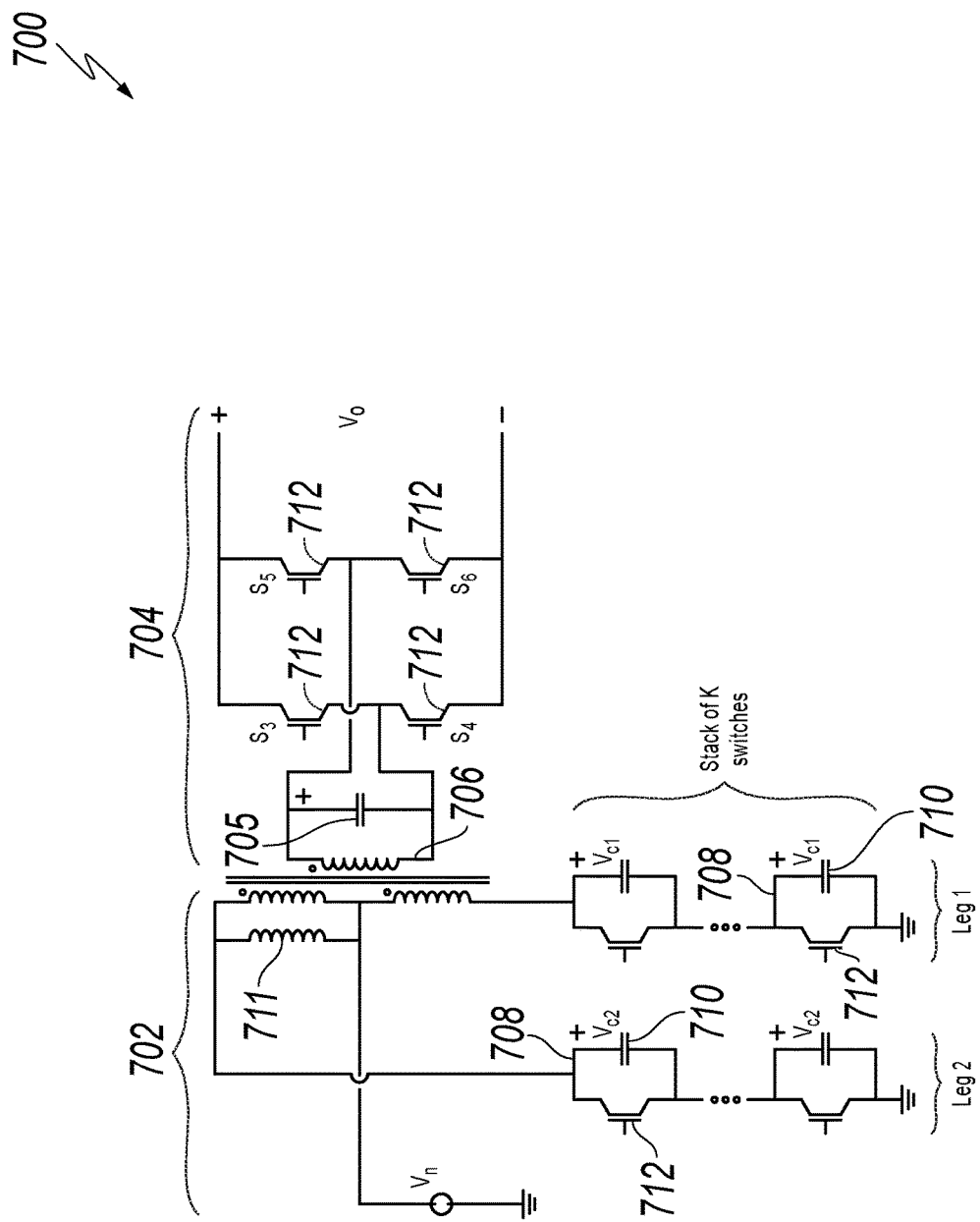
FIG. 7 is a circuit diagram of an isolated buck boost DC-DC converter according to an exemplary embodiment.

FIG. 7 is a circuit diagram of an isolated buck boost DC-DC converter 700. The isolated DC-DC converter 700 includes an input side 702 and an output side 704. A person skilled in the art will recognize that a DC-DC converter presents a unique situation where the input frequency and the output frequency equal 0. A multiple-winding transformer 706 is disposed between the input side 702 and the output side 704. In a typical embodiment, the multiple-winding transformer 706 provides transfer of power between the input side 702 and the output side 704 while maintaining galvanic isolation between the input side 702 and the output side 704. That is, no electrical current passes from the input side 702 to the output side 704 or vice versa. In a typical embodiment the isolated DC-DC converter 700 is not reversible.

Still referring to FIG. 7, the output side 704 includes a plurality of bidirectional blocking switches 712. The input side 702 includes a plurality of switches 708. In a typical embodiment, each switch 708 includes capacitors 710, which may be an external or parasitic capacitor and a bidirectional blocking semiconductor switching device 712. By way of example, the semiconductor switch 712 on the input side 702 and the output side 704 can be a reverse-blocking IGBT or a reverse-blocking MOSFET. The switch 712 on the output side 704 may, in a typical embodiment, be of similar construction. By way of example, the isolated DC-DC converter 700 is illustrated in FIG. 7 as including four of the switches 708. However, in other embodiments, the number of switches 708 utilized could increase or decrease as dictated by design requirements. In a typical embodiment, the switches 708 are arranged in a stacked configuration. In a typical embodiment, as the number of switches 708 utilized increases, the voltage stress on each switch 708 decreases by a factor of 1/K, K being the number of stacked switches per input leg as shown in FIG. 7. The reduction of voltage stress is due to the series connection of the switches and the presence of a capacitor in parallel with each switch. This is a significant advantage over similar DC-DC converters, such as a push-pull converter, that suffer from large voltage stress on the input side switches. The capacitors 710 and 705 together with the inductor 711 form a parallel resonant tank that partially resonates during operation of the isolated buck boost DC-DC converter 700. The inductor 711 can, in various embodiments, be the magnetizing inductance of the multiple winding transformer or an external or parasitic inductor. The input and output terminals of the isolated buck-boost DC-DC converter 700 may be connected to a filter network such as a capacitive or capacitive/inductive filter.

Other advantages of the isolated buck-boost DC-DC converter 700 include higher efficiency due to soft-switching of the semiconductors and higher reliability in the event of component failure. Efficiency and reliability are improved over a conventional "push-pull" converter.

Figure 8:
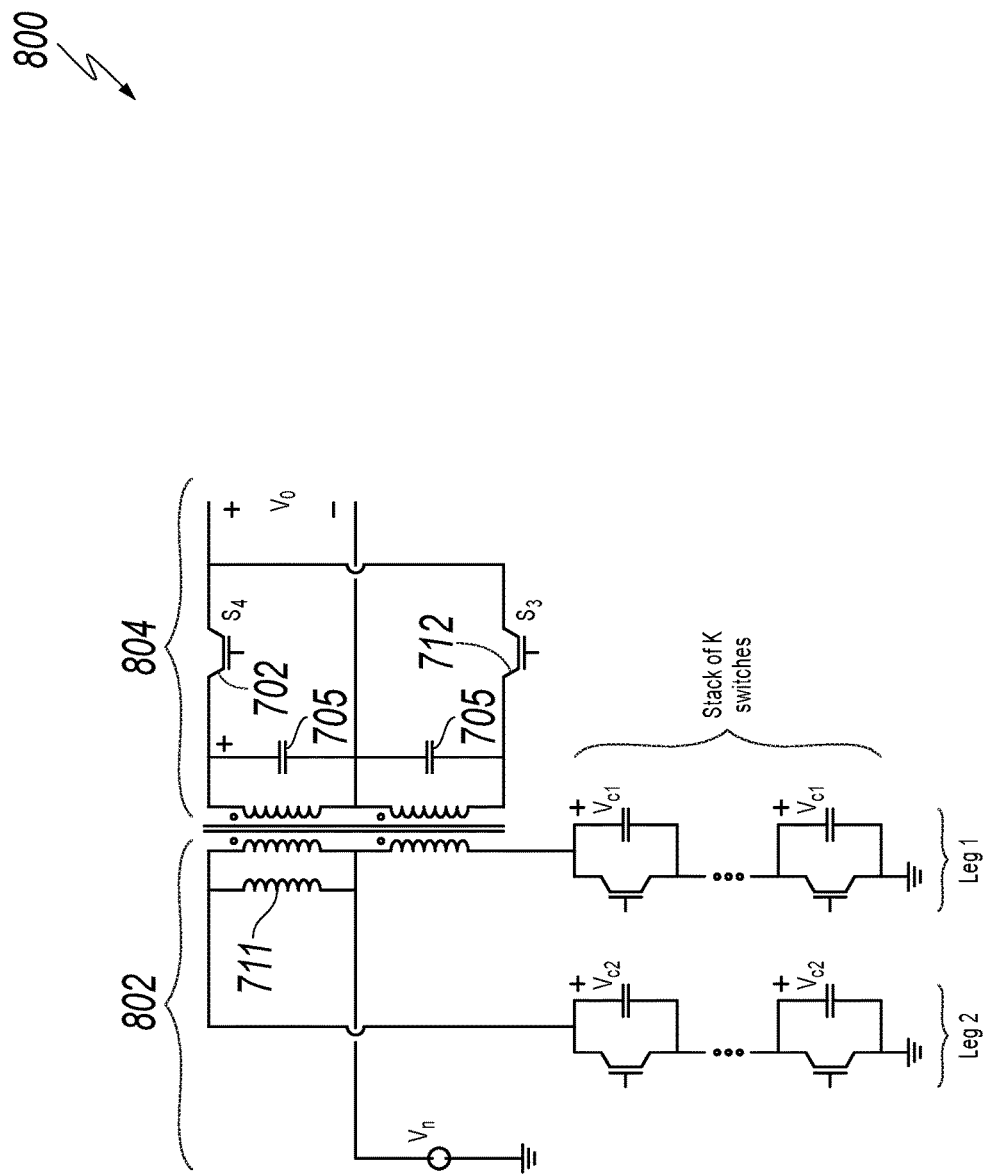
FIG. 8 is a circuit diagram of an isolated buck boost DC-DC converter having a four-winding transformer according to an exemplary embodiment.

FIG. 8 is a circuit diagram of an isolated buck boost DC-DC converter 800 having a four-winding multiple-winding transformer 806 disposed between the input side 802 and the output side 804. The isolated buck boost DC-DC converter 800 is similar in configuration to the isolated buck boost DC-DC converter 700 with the exception that the multiple-winding transformer 806 is a four-winding transformer. The configuration of the switches 812 on the output side 804 are similar to those described in the isolated buck-boost DC-DC converter 700.

Figure 9:
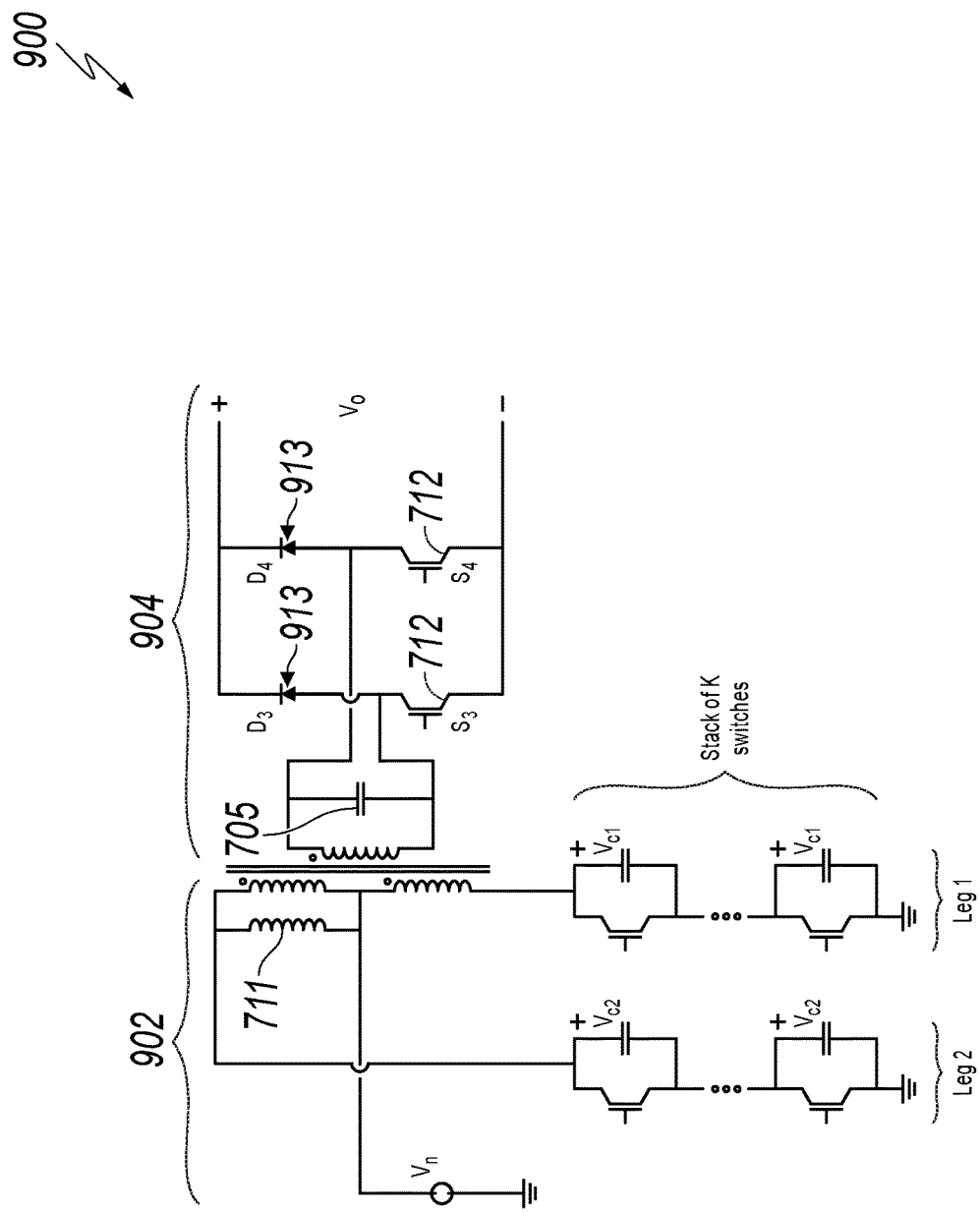
FIG. 9 is a circuit diagram of an isolated buck boost DC-DC converter having a plurality of diodes according to an exemplary embodiment.

FIG. 9 is a circuit diagram of an isolated buck boost DC-DC converter 900 having a plurality of diodes 913 disposed on the output side 904. The isolated buck boost DC-DC converter 900 is similar in configuration to the isolated buck boost DC-DC converter 700 with the exception that one or more of the output switches 712 are replaced with diodes 913.

During operation, in reference to FIGS. 7-9, as stated before, capacitors 710 and 705, together with the link form a parallel resonant link. The link current and voltage are hereinafter referred to the link current and link voltage, respectively. The converters are different than the conventional push-pull converters in the sense that the inductance 711 transfers the energy by charging from the source and discharging into the output. Each link cycle is comprised of eight operating modes as elaborated in the rest of this section. By no way of limitation and for the sake of brevity and simplicity of naming conventions, it is assumed that components are ideal. By no way of limitation, it is assumed that there is a capacitive filter 707 connected between the output terminals of the converters 700, 800, and 900.

Operating Modes of Converters 700, 800, and 900

In reference to DC-DC converters of FIGS. 7-9, each converter includes a parallel resonant tank (hereinafter referred to as the link). An operation cycle of the DC-DC converters 700, 800, and 900 includes eight modes. In two modes, energy is transferred from the input source to the resonant link, and in two modes, energy is transferred from the resonant link to the output terminals. In the remaining four modes, no power transfer to or from the terminals happens. The input current reference may be defined as the desired DC current through the input terminal of the power converter.

Mode 1: The link is charged by the source through switches in leg 1 in reference to FIGS. 7, 8, and 9. All other switches are in their blocking state. As shown in FIG. 17, capacitor voltages $v_{C1}$, $v_{C2}$, and the link voltage are approximately 0, $2V_{in}/K$, and $V_{in}$, respectively. Once one half of the input current reference is met, switches in leg $S_1$ are gated off. In various embodiments, the current reference is defined as being met when the current into the converter, averaged over a link cycle, equals the current reference. The other half of the input reference is to be met in mode 5. Due to the presence of a capacitor in parallel with each switch in leg 1, the rate of rise of switch voltage at turn-off is limited. The capacitor is a loss-less snubber and effectively reduces the switching loss at turn-off.

Mode 2: None of the switches conduct in this mode. The link resonates together with the capacitors 710 and 705. The link voltage changes polarity in this mode and becomes negative, and the link current has its peak value, $+I_{peak}$, as shown in FIG. 17 (A or B). This mode goes on until the negative link voltage matches the reflected output voltage through the transformer turn ratio in magnitude. Reflected output voltage refers to voltage that is reflected to the primary side of the converter through the transformer. At this point, the output switches $S_3$ and $S_6$ in FIG. 7, $S_3$ in FIG. 8, and $S_4$ and diode $D_3$ in FIG. 9 start conducting. The voltage on all these switches is almost zero, leading to a zero-voltage switching condition and significantly reducing turn-on losses on the switches.

Mode 3: The link is connected to the load through the mentioned switches and diode in mode 2. The link current reduces almost linearly as its energy is transferred to the output filter capacitor. The negative link voltage in this mode is approximately equal to the reflected output voltage $V_o$ through the transformer turns ratio. Switches $S_3$ and $S_6$ in FIG. 7, $S_3$ in FIG. 8, and $S_4$ in FIG. 9 are gated off when the aggregate energy stored in the link and capacitors 710 and 705 is reduced to a desired level $E_{desired}$. This ends mode 3. The reason why such a condition is chosen to end mode 3 and selection of a proper value for $E_{desired}$ is elaborated later. Because capacitor 705 and the output filter capacitor 707 have almost the same voltage, voltage rise on the mentioned switches happens slowly and turn-off losses are effectively reduced.

Mode 4: None of the switches carry current in this mode. With the leftover energy from mode 3, the link resonates. As shown in FIG. 17 (a or b), the link current crosses zero in this mode, causing the link voltage to have its negative peak, $-V_{peak}$. This mode continues until the voltage $v_{C2}$ reaches zero. At this point, switches in leg 2 to start conducting as voltage on them is zero. This facilitates zero-voltage switching for leg 2 switches and significantly reduces turn-on loss on the switch.

Mode 5: As in mode 1, power is transferred from the input to the link. The link, however, is charged with negative current and voltage since leg 2 switches conduct. Considering the fact that half the input current was met in mode 1, switches in leg 2 are gated off as soon as the other half of the input current is met. Similar to mode 1, the rate of rise of voltage on leg 2 switches is limited by their parallel capacitors, and the loss associated with switch turn-off is reduced.

Mode 6: Similar to mode 2, none of the switches conduct in this mode. The link resonates together with the capacitors 710 and 705. The link voltage changes polarity in this mode and becomes positive, and the link current has its negative peak value, $-I_{peak}$, as shown in FIG. 17 (a or b). This mode goes on until the positive link voltage matches the reflected output voltage through the transformer turns ratio in magnitude. At this point, the output switches $S_4$ and $S_5$ in FIG. 7, $S_4$ in FIG. 8, and $S_3$ and diode $D_4$ in FIG. 9 start conducting. The voltage on both switches is almost zero, leading to a zero-voltage switching condition and significantly reducing turn-on losses on the switches.

Mode 7: Similar to mode 3, the link is discharged into the output. Output switches mentioned in mode 6 carry the link current in this mode. This mode continues until the link energy reduces to a desired level $E_{desired}$. Because of capacitor(s) 705 and output filter capacitor 707, soft-switching is achieved at turn off for both switches.

Mode 8: None of the switches conduct in this mode. The link resonates and the link current changes polarity to become positive. At zero crossing of link current, the link voltage peaks at $+V_{peak}$. Once the link voltage equals the input voltage, leg 1 switches start conducting. Similar to mode 4, turn-on happens under zero-voltage switching condition. After mode 8, the converter starts from mode 1 and repeats the cycle.

Figure 17A:
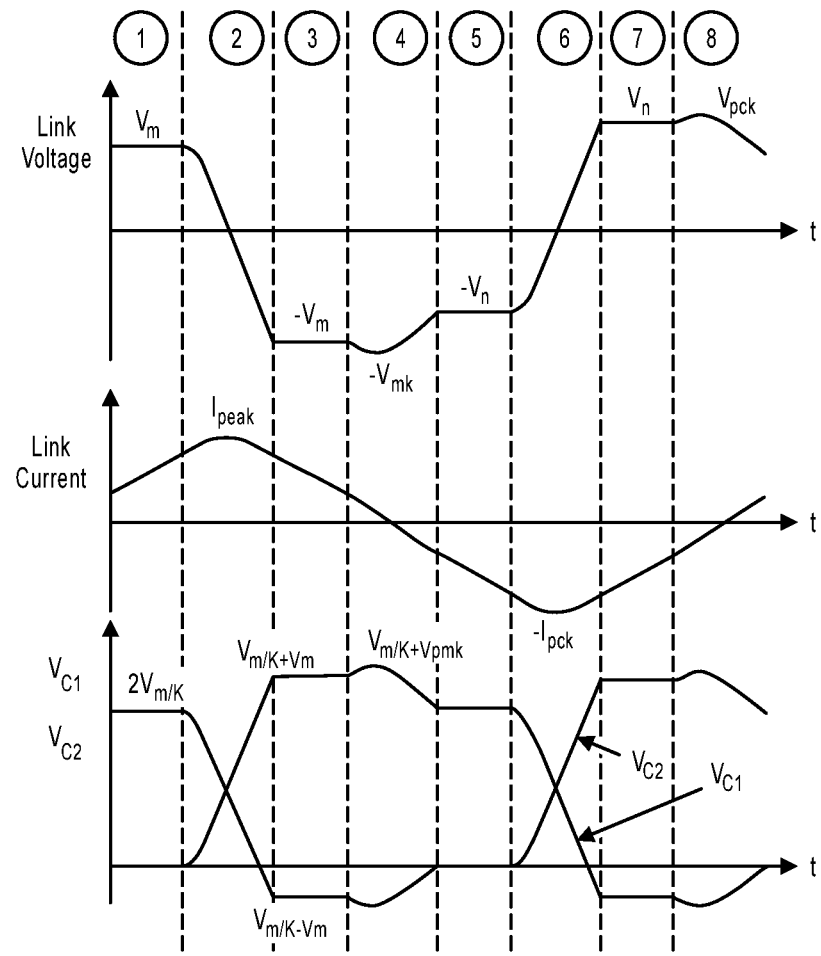
FIGS. 17A-17B are plots of link voltage and link current illustrating eight modes of operation during DC-DC conversion according to an exemplary embodiment.
Figure 17B:
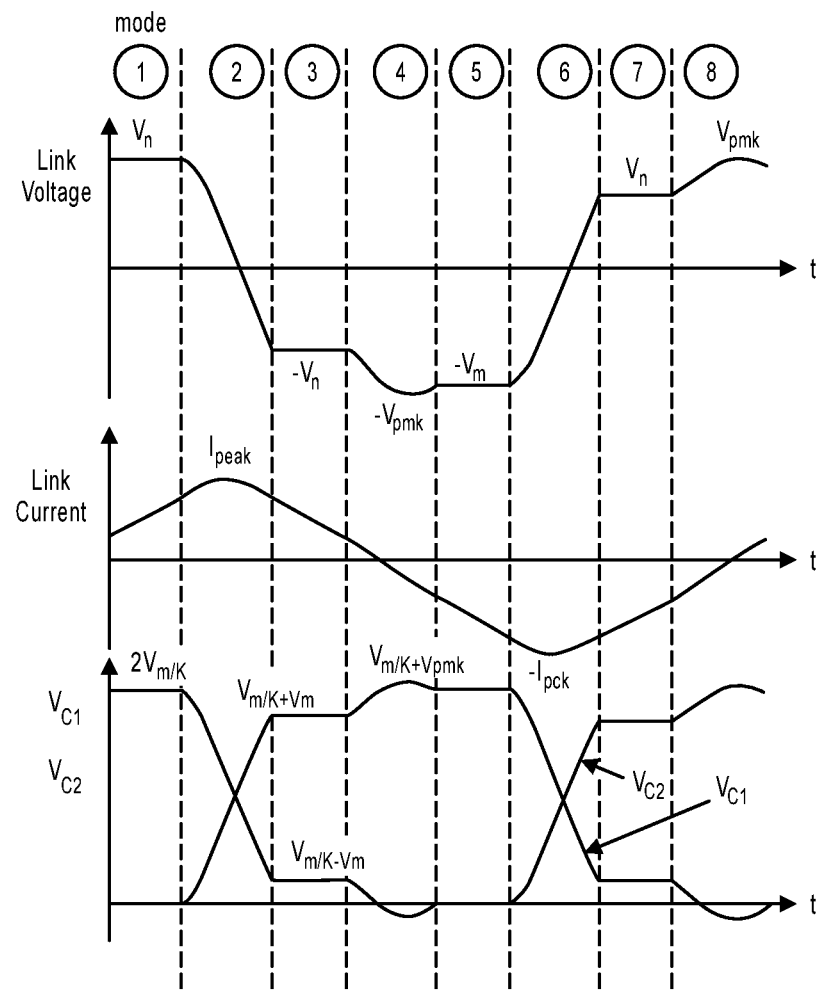

FIGS. 17A and 17B depict the converter waveforms for boost and buck modes, respectively. Buck mode is when the input voltage $V_{in}$ is greater than $V_o'$, where $V_o'$ is the output voltage $V_o$ referred to one of the input side transformer windings through the transformer turns ratio. The principle of operation and implementation is exactly the same in both modes with no difference. The above description of modes indicates that all resonant modes are even-numbered, and there is one resonant mode between every two power-transfer modes. Resonant modes are meant to provide soft-switching conditions for all turn-on and turn-off transitions, and are not meant to transfer a significant amount of power between the terminals. Therefore it is important to select minimal values for link inductors and capacitors to minimize the resonant periods. Too small link values, however, necessitate very high sampling rate on the digital controller, and further complicate hardware implementation. The alternating "Push-Pull" nature of the switching sequence provides bipolar utilization of the magnetic core. As for all double-ended converters, this increases the power density and eliminates the need for any core resetting scheme. Since the amount of link energy at the end of modes 3 and 7 are forced by the controller to be equal, the unwanted dc offset of the magnetizing inductor (which is a major problem for the push-pull topology) is automatically eliminated. Due to the fact that there is a stack of K switches 712 with parallel capacitors 710 in each input leg in FIGS. 7-9, the voltage stress on each input switch is reduced by a factor of 1/K as K increases.

Selection of $E_{desired}$ for Converter 700, 800, and 900

Selection of $E_{desired}$: It was mentioned earlier in description of modes that the requirement to end modes 3 and 7 is to have the energy left in the link reduced to a desired level, $E_{desired}$. This condition guarantees that the same amount of energy that was delivered to the link in mode 1 (or mode 5), is taken from the link in mode 3 (or mode 7). In other words, it assures that the link energy content at the beginning of mode 1 equals the link energy content at the end of mode 3, thereby indirectly balancing the input and output powers. Since $E_{desired}$ is the link energy content, it also determines the link peak voltage in modes 4 and 8. While using $E_{desired}$ as criteria is an effective way to end modes 3 and 7, it is not the only way and it is just one of many ways (No limitation).

DC-AC Conversion

Figure 10:
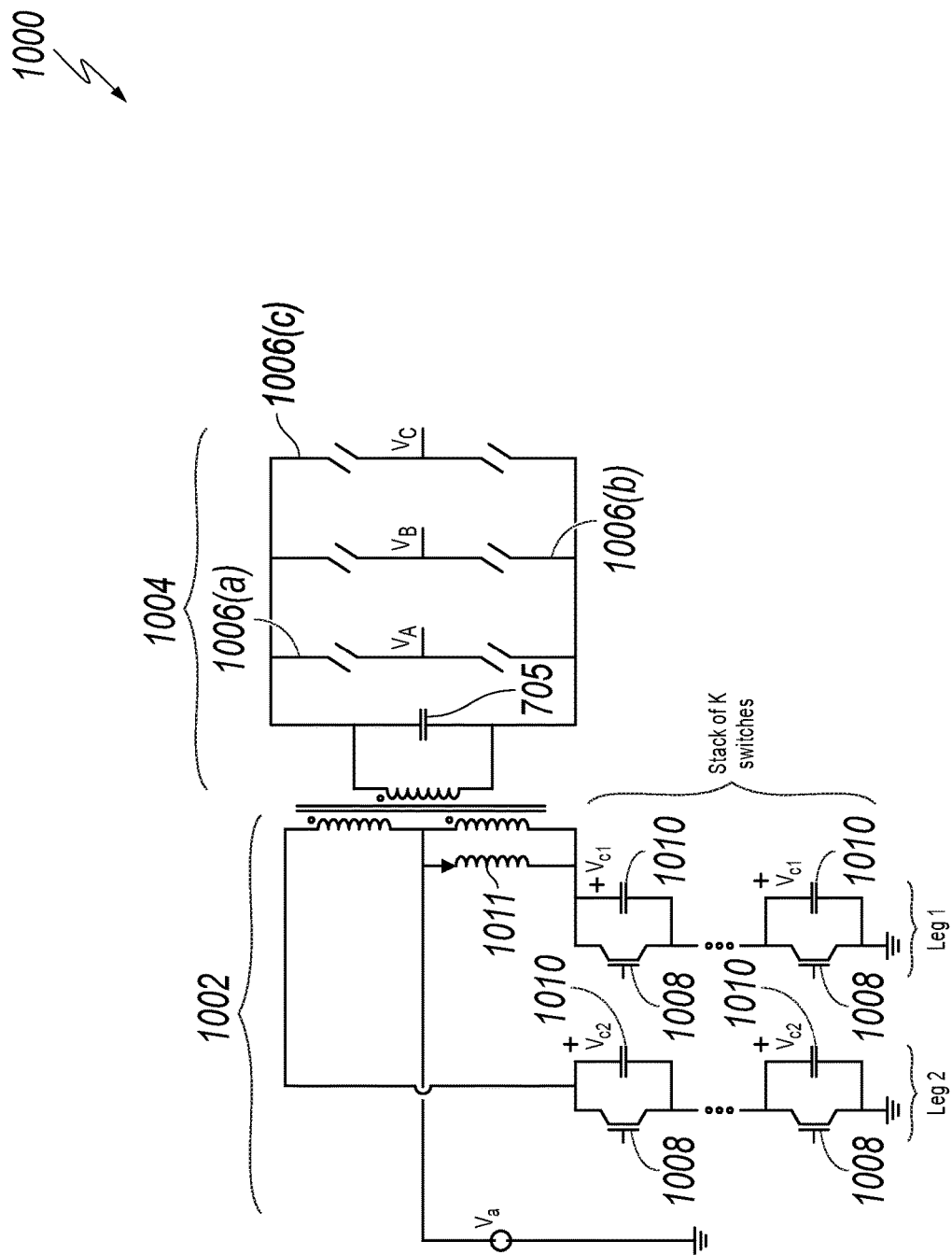
FIG. 10 is a circuit diagram of a DC-AC converter according to an exemplary embodiment.
Figure 11A:
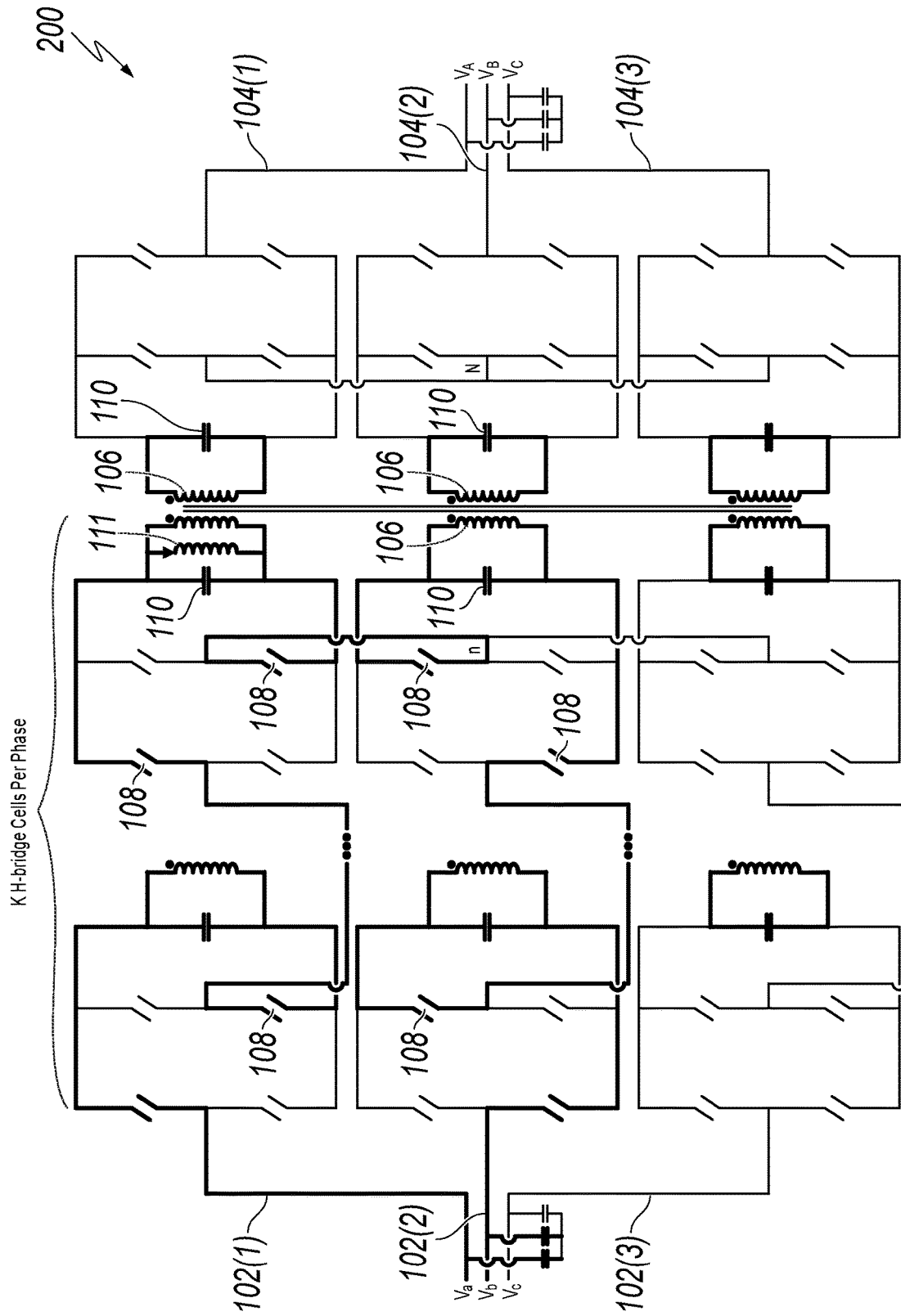
FIGS. 11A-11E are circuit diagrams illustrating modes of operation of the cascaded three-phase buck boost AC-AC converter of FIG. 2.
Figure 11B:
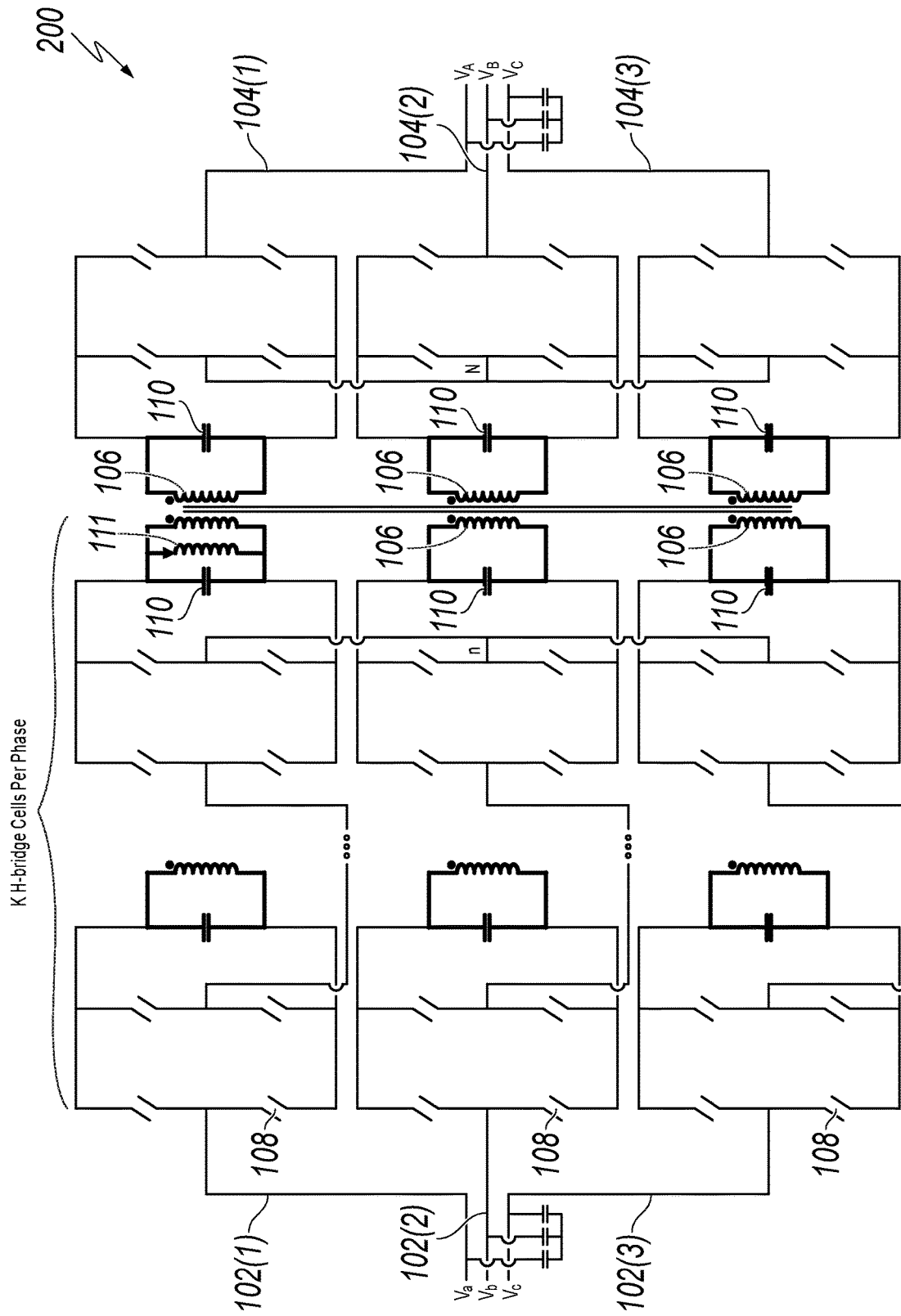
Figure 11C:
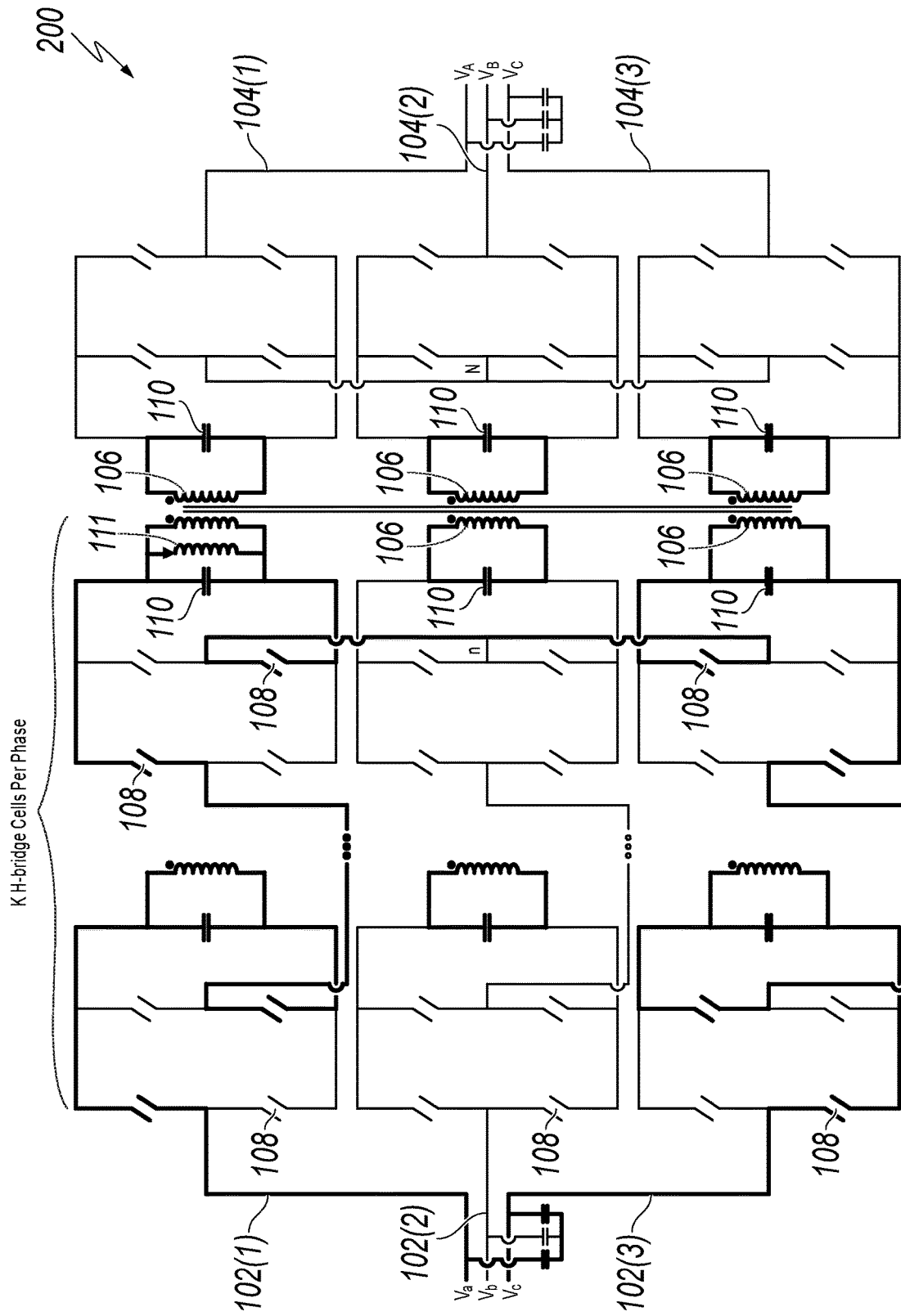
Figure 11D:
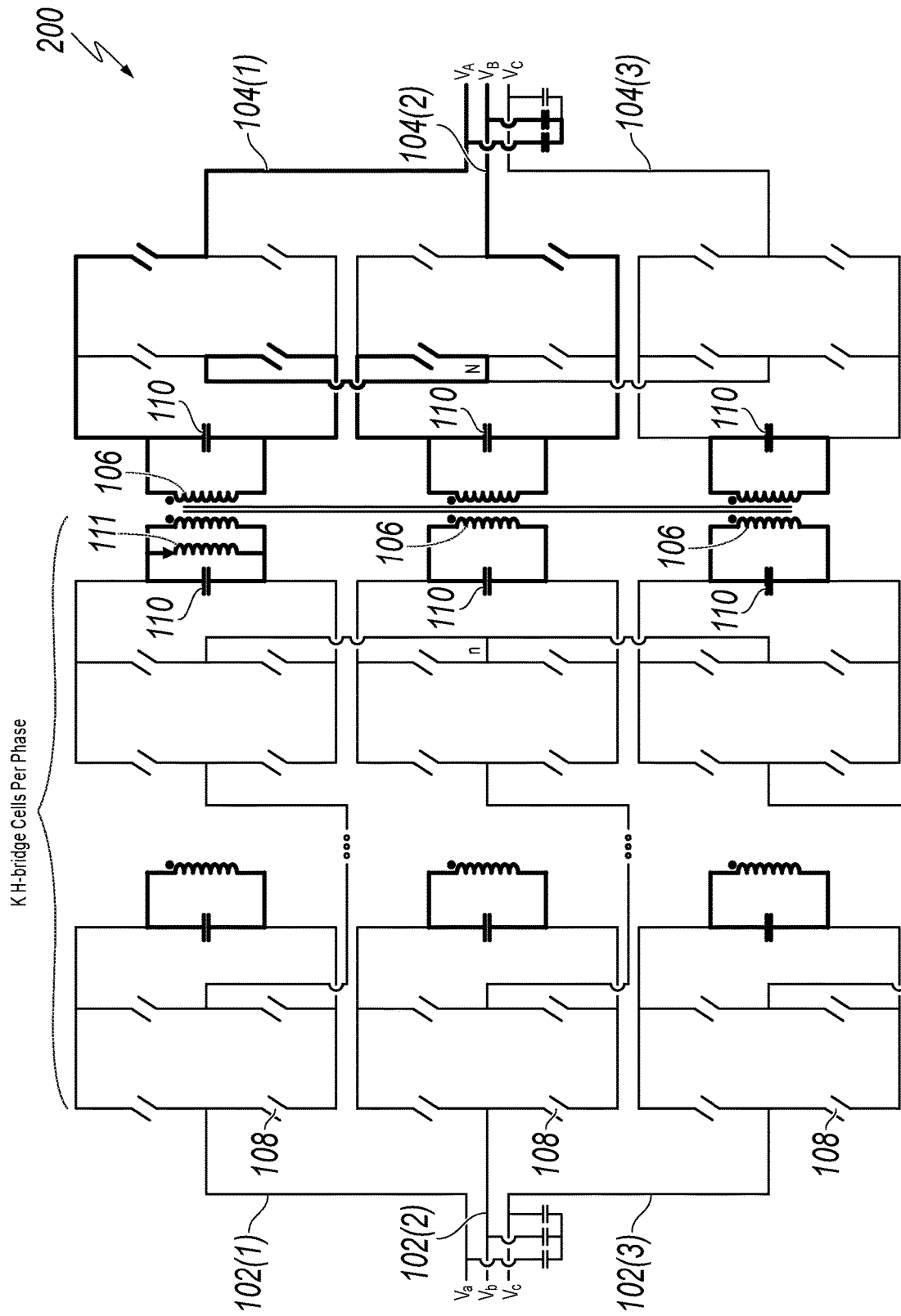
Figure 11E:
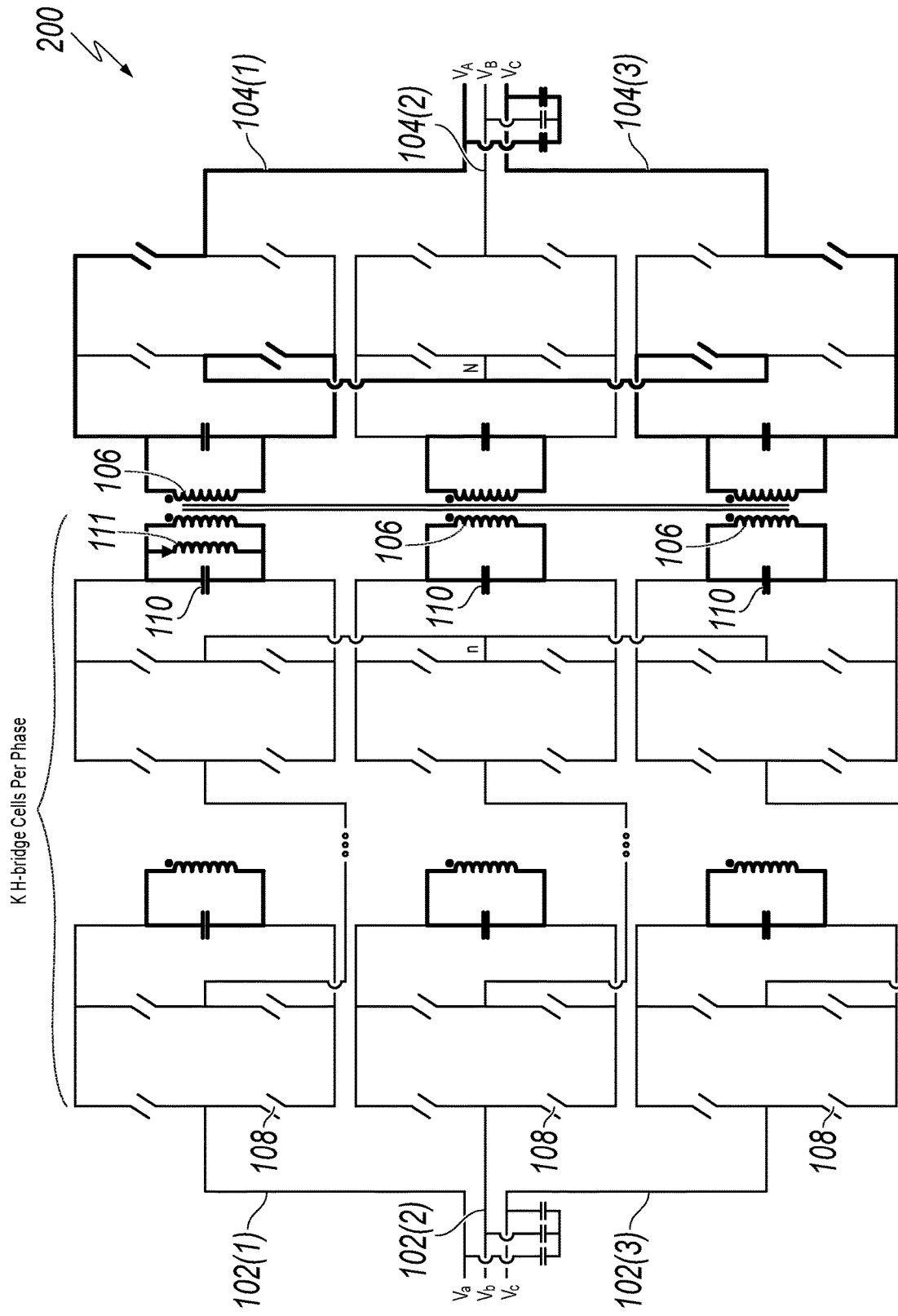
Figure 12A:
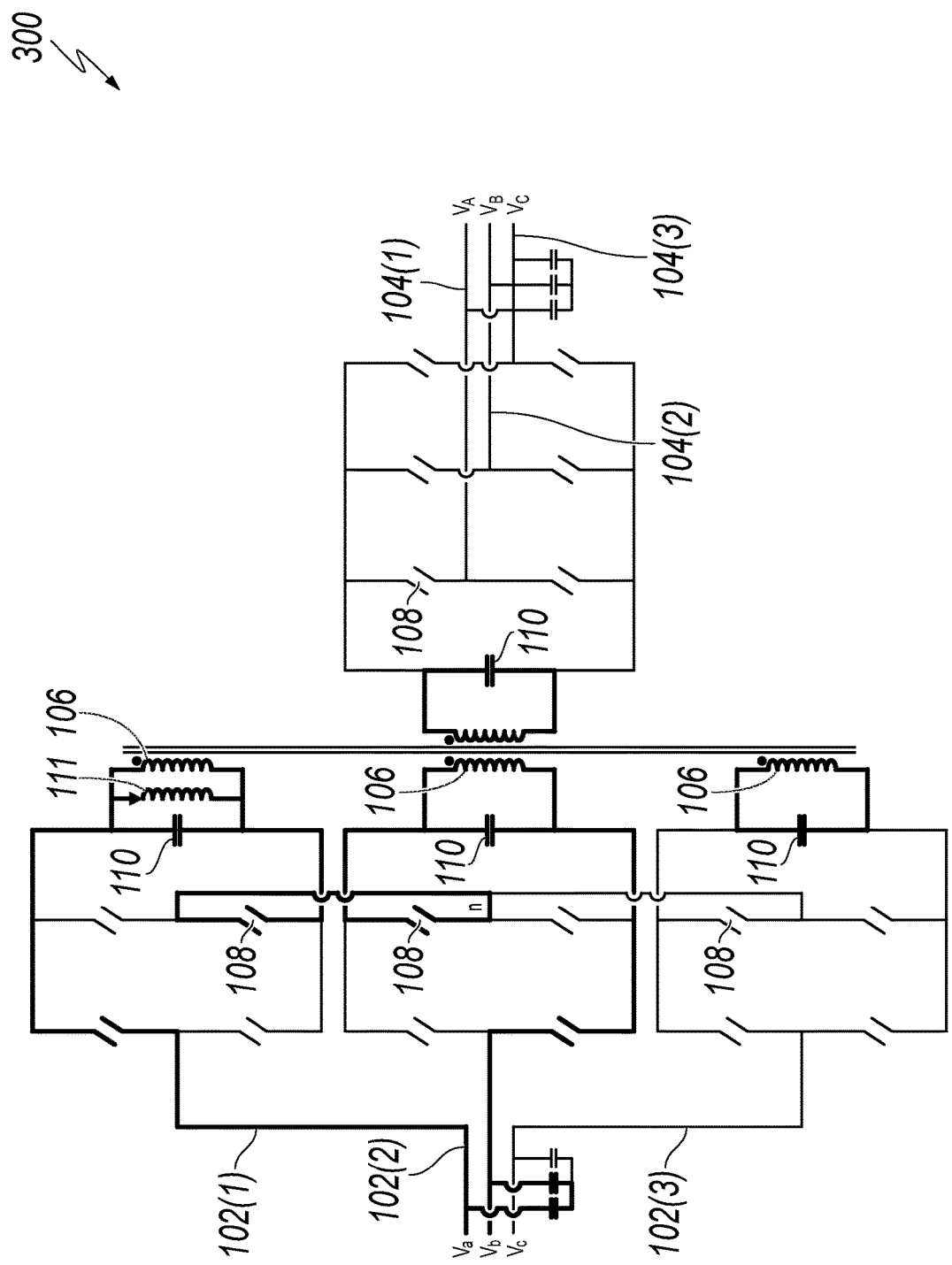
FIGS. 12A-12E are circuit diagrams illustrating modes of operation of the three-phase buck-boost AC-AC converter of FIG. 3.
Figure 12B:
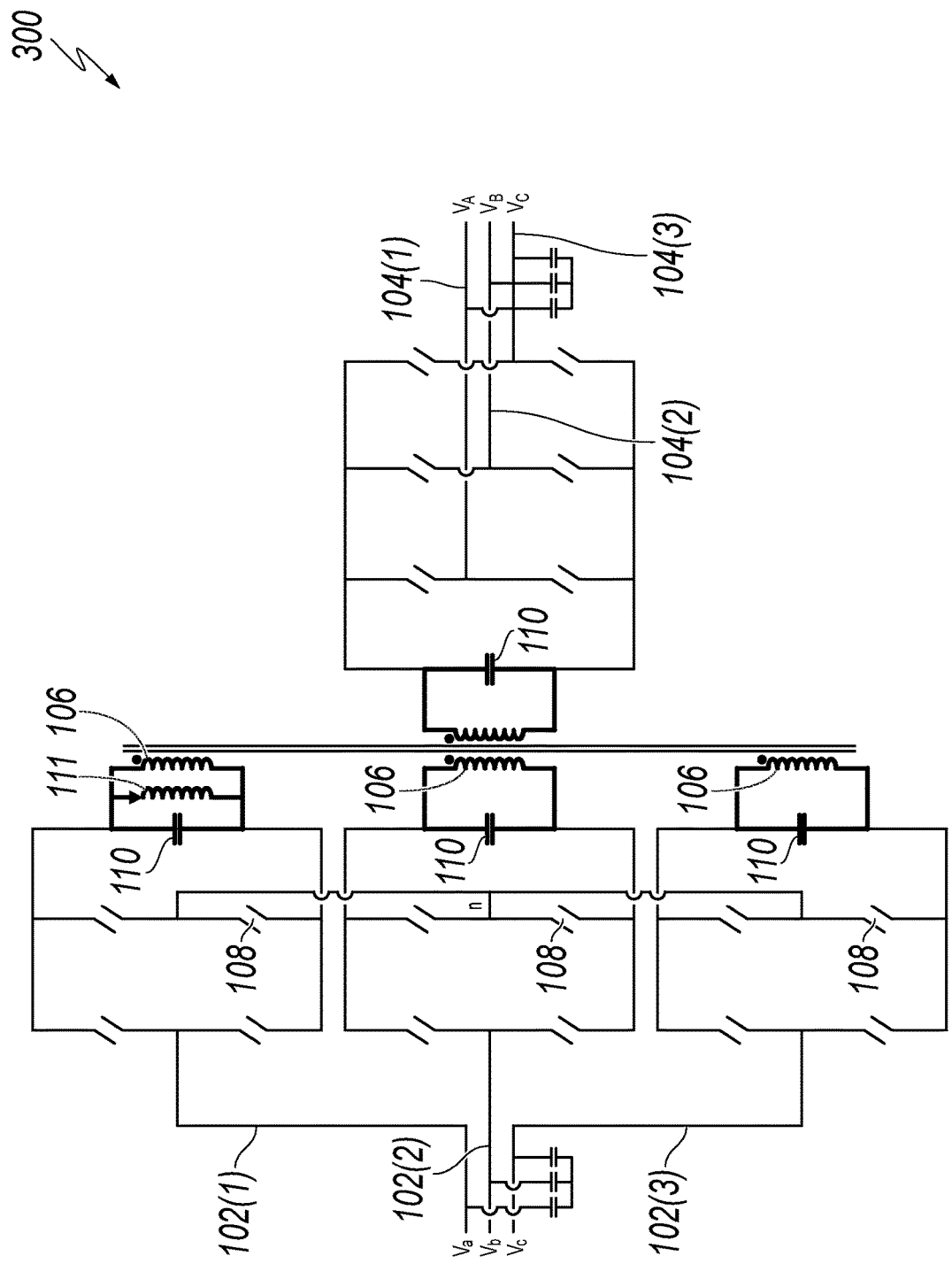
Figure 12C:
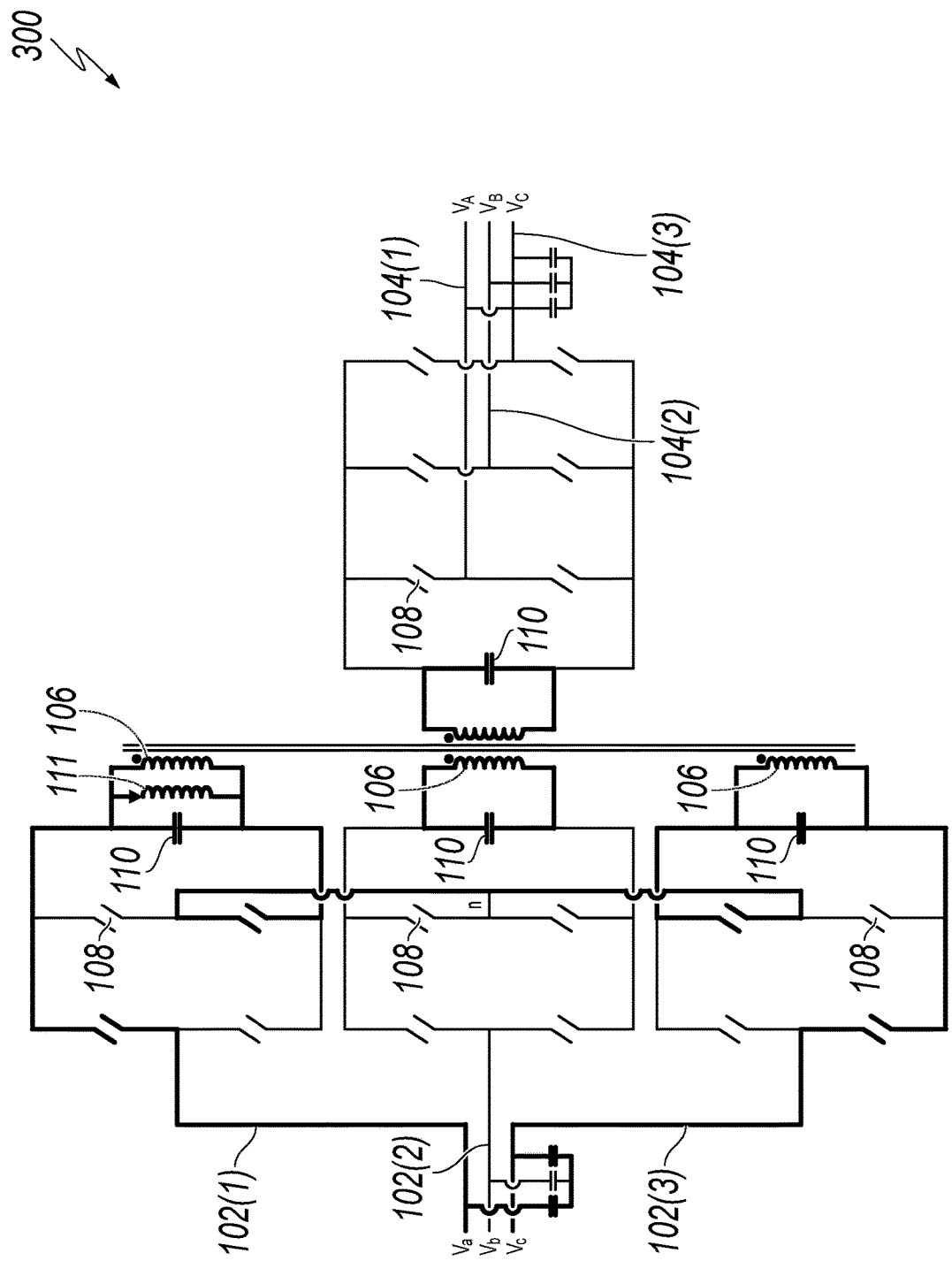
Figure 12D:
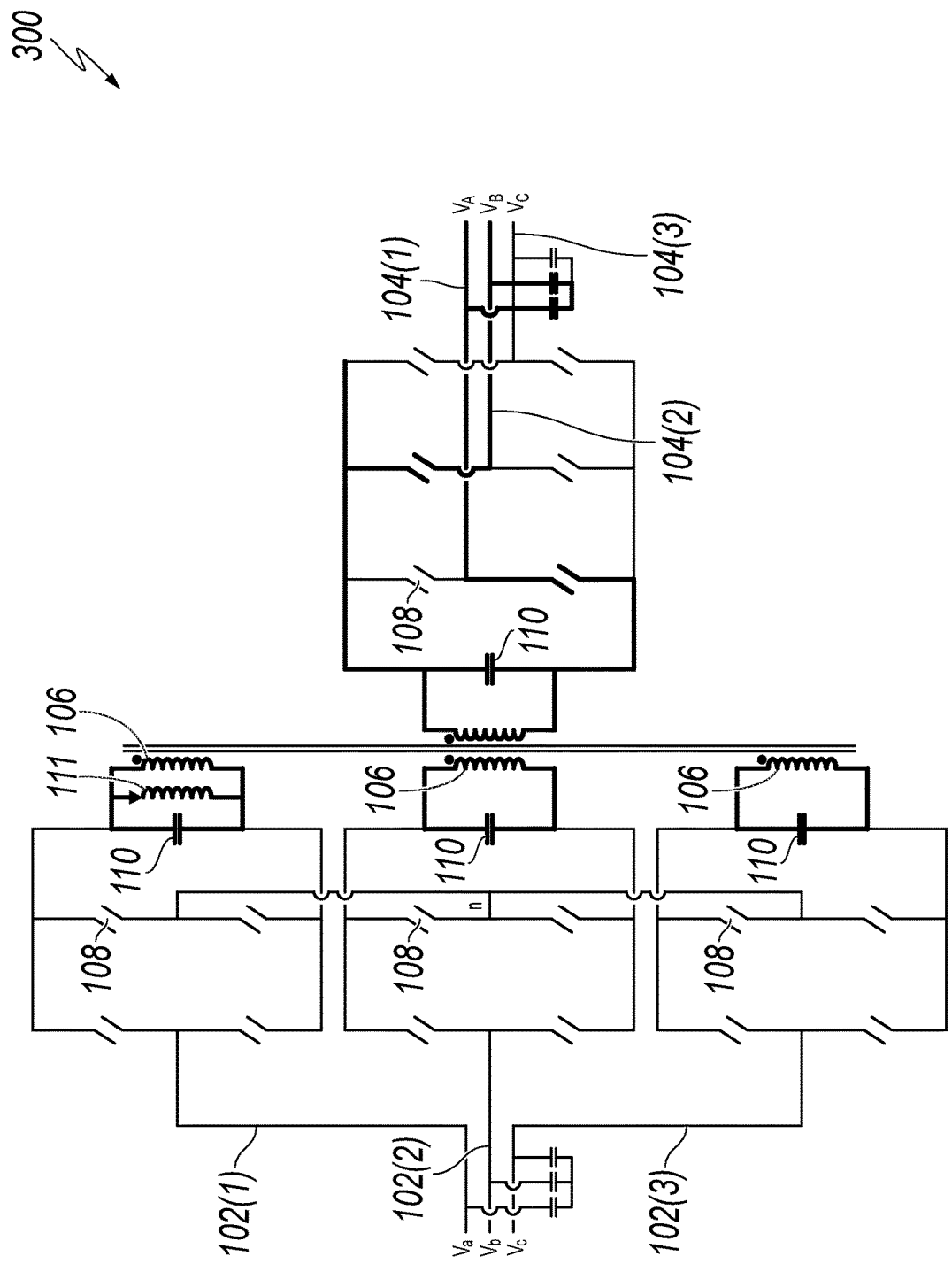
Figure 12E:
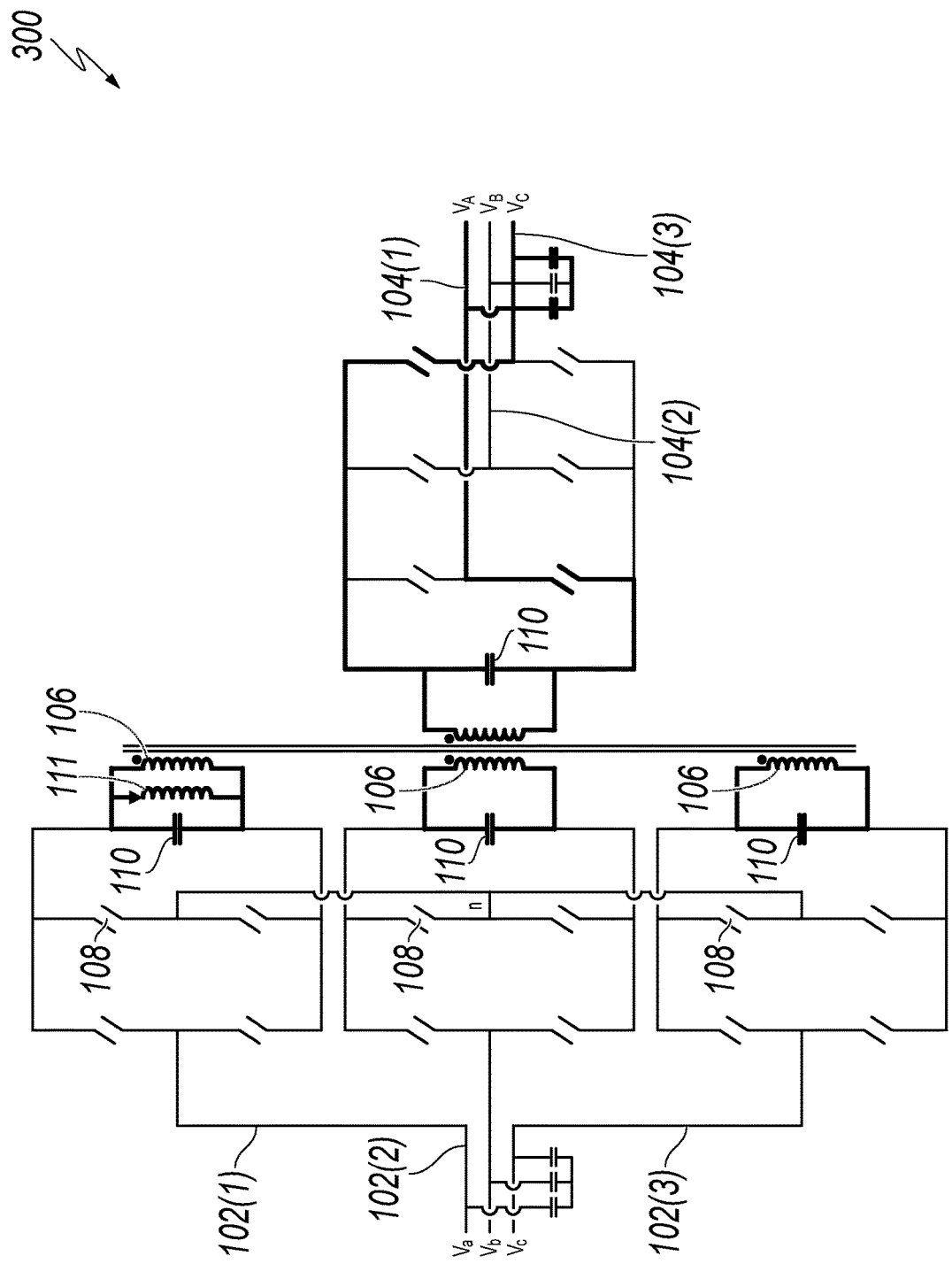
Figure 13A:
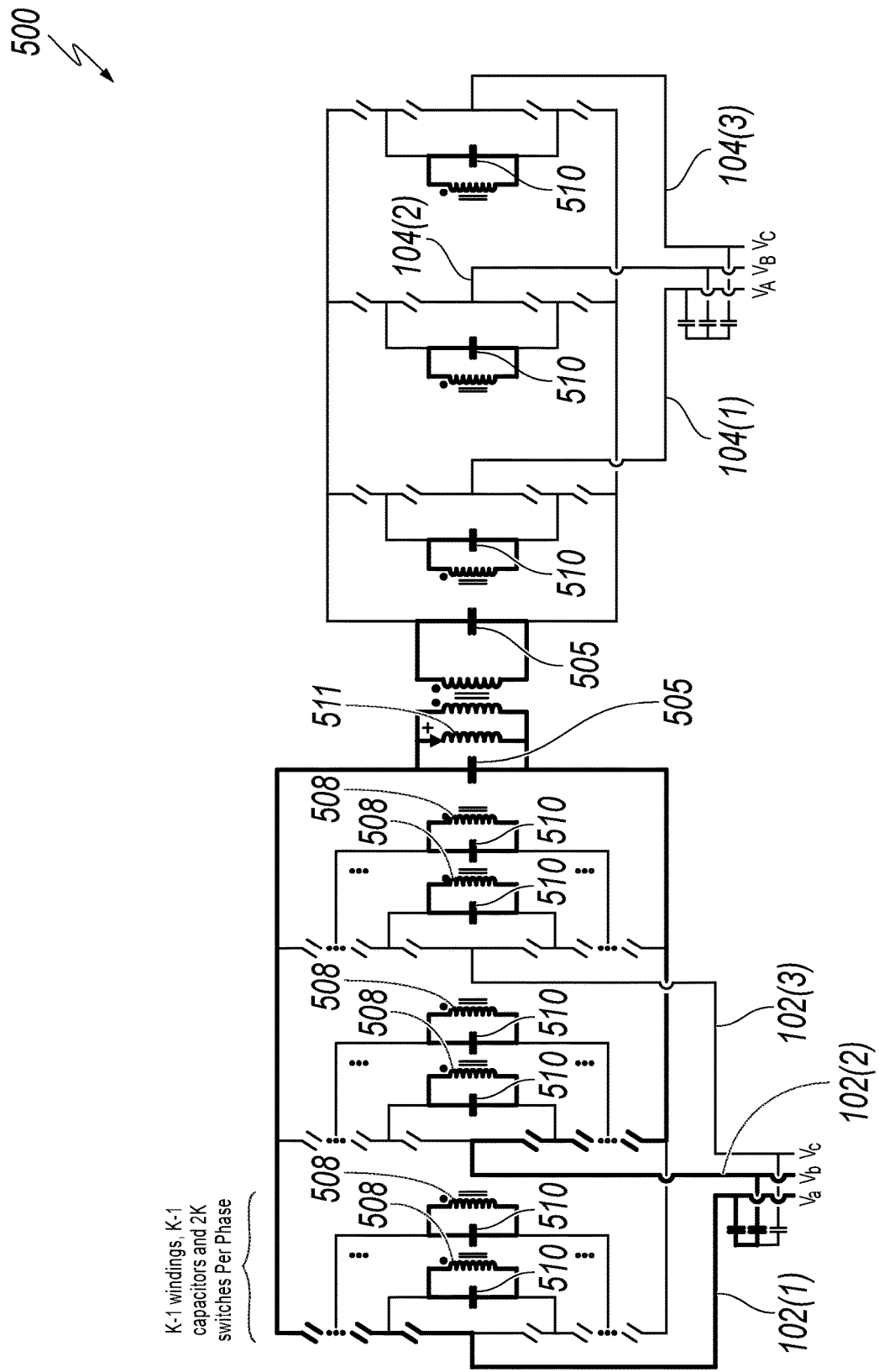
FIGS. 13A-13E are circuit diagrams illustrating modes of operation of the three-phase AC-AC buck-boost converter of FIG. 5.
Figure 13B:
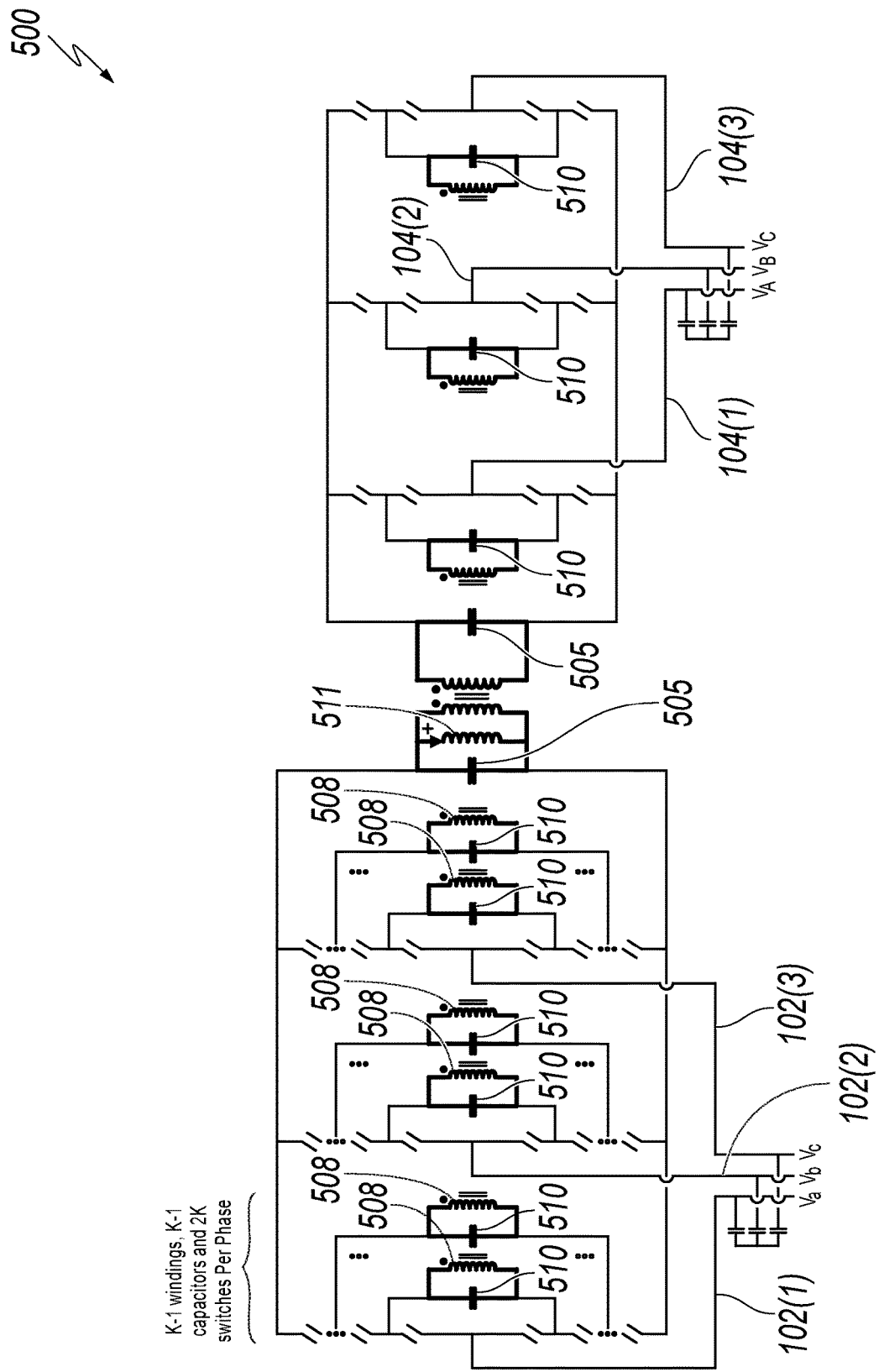
Figure 13C:
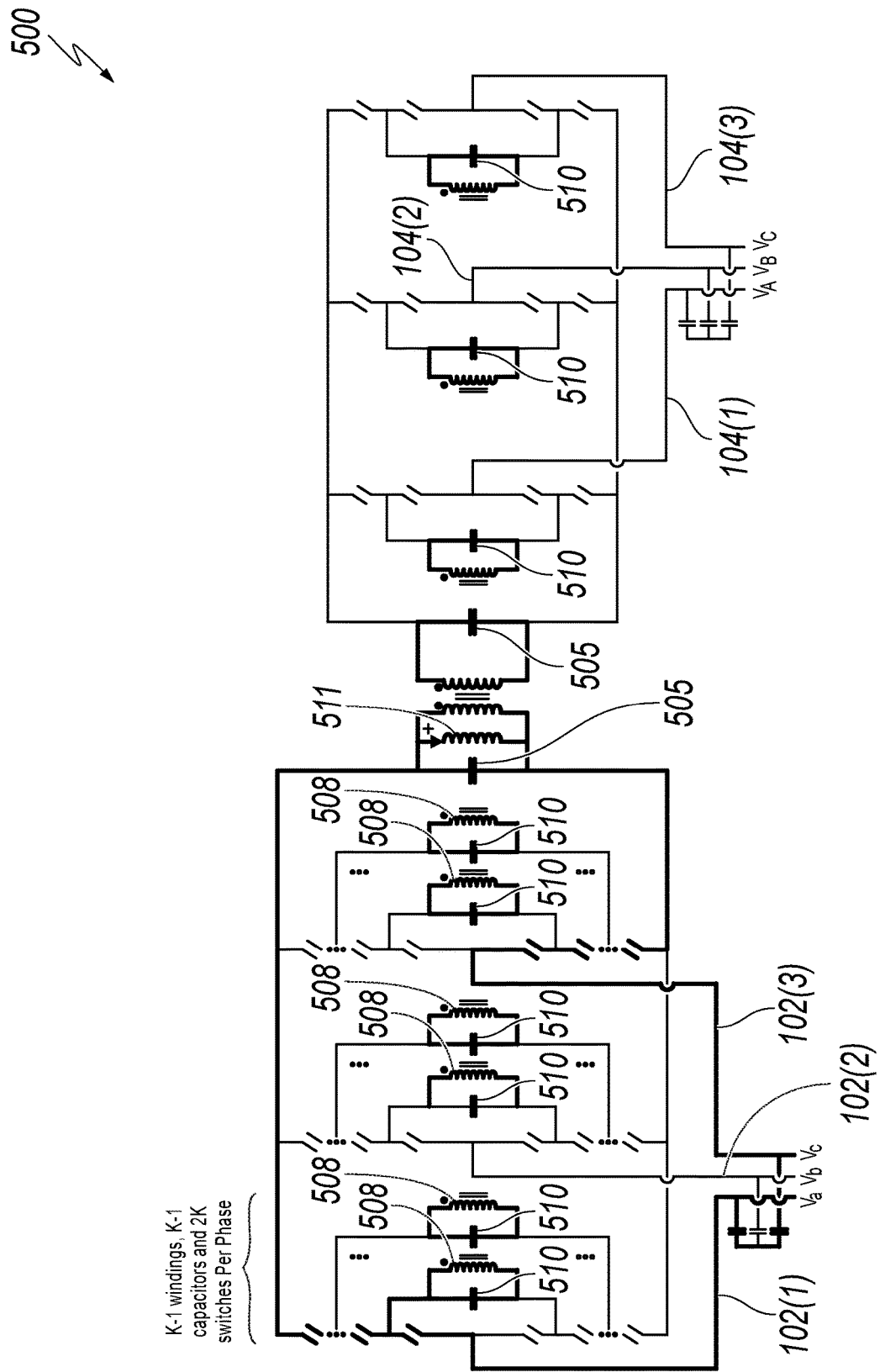
Figure 13D:
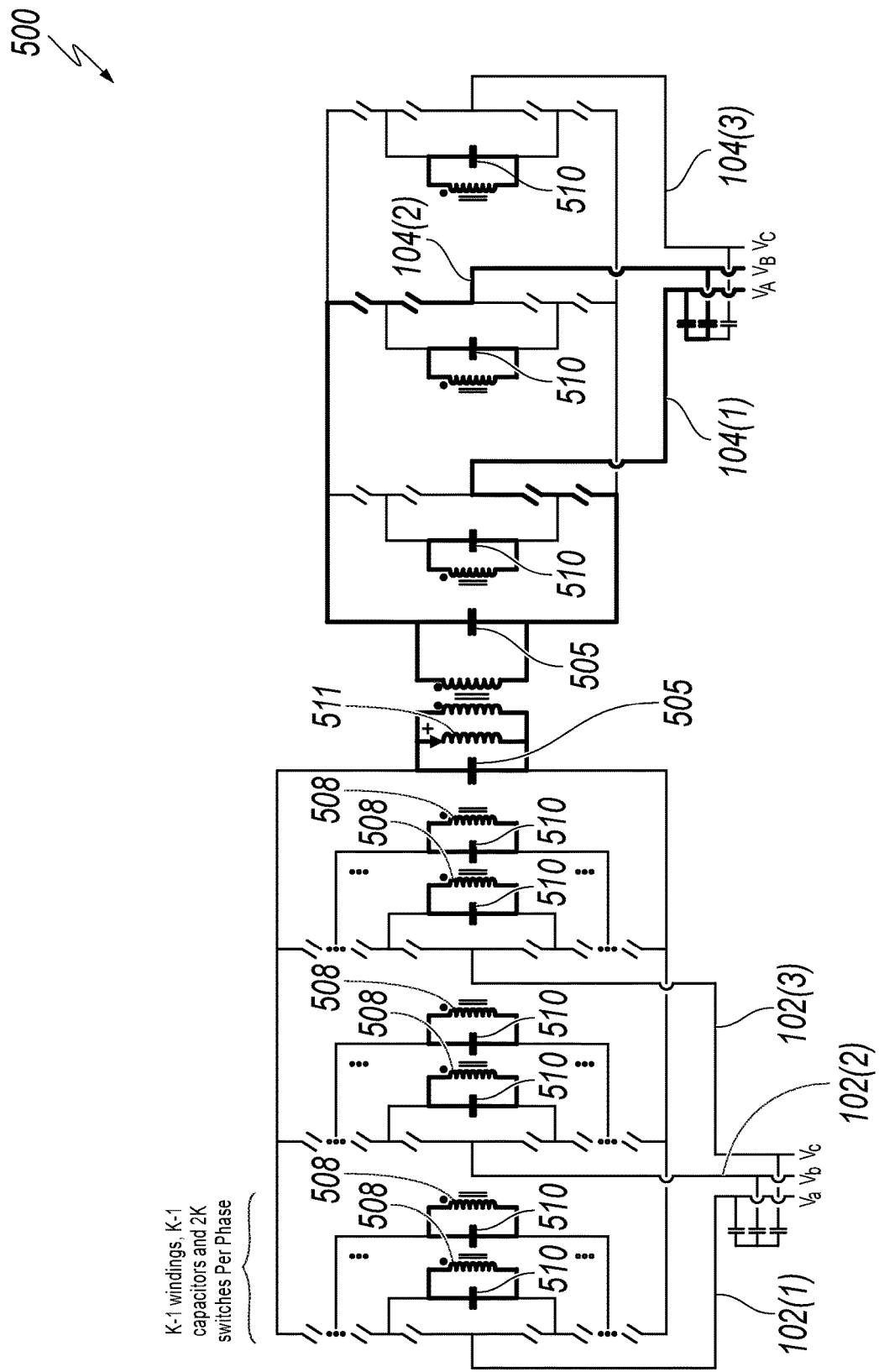
Figure 13E:
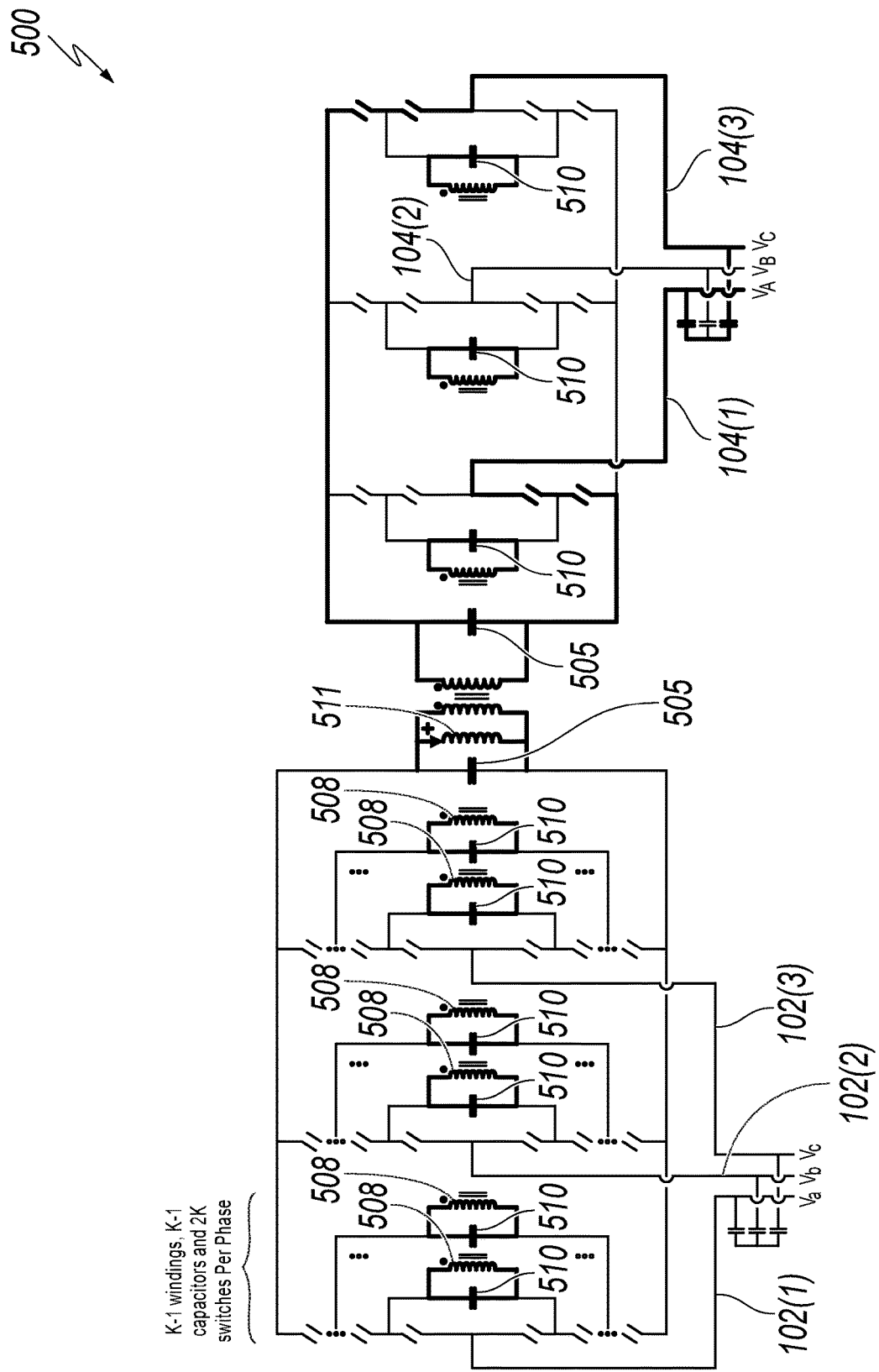
Figure 14A:
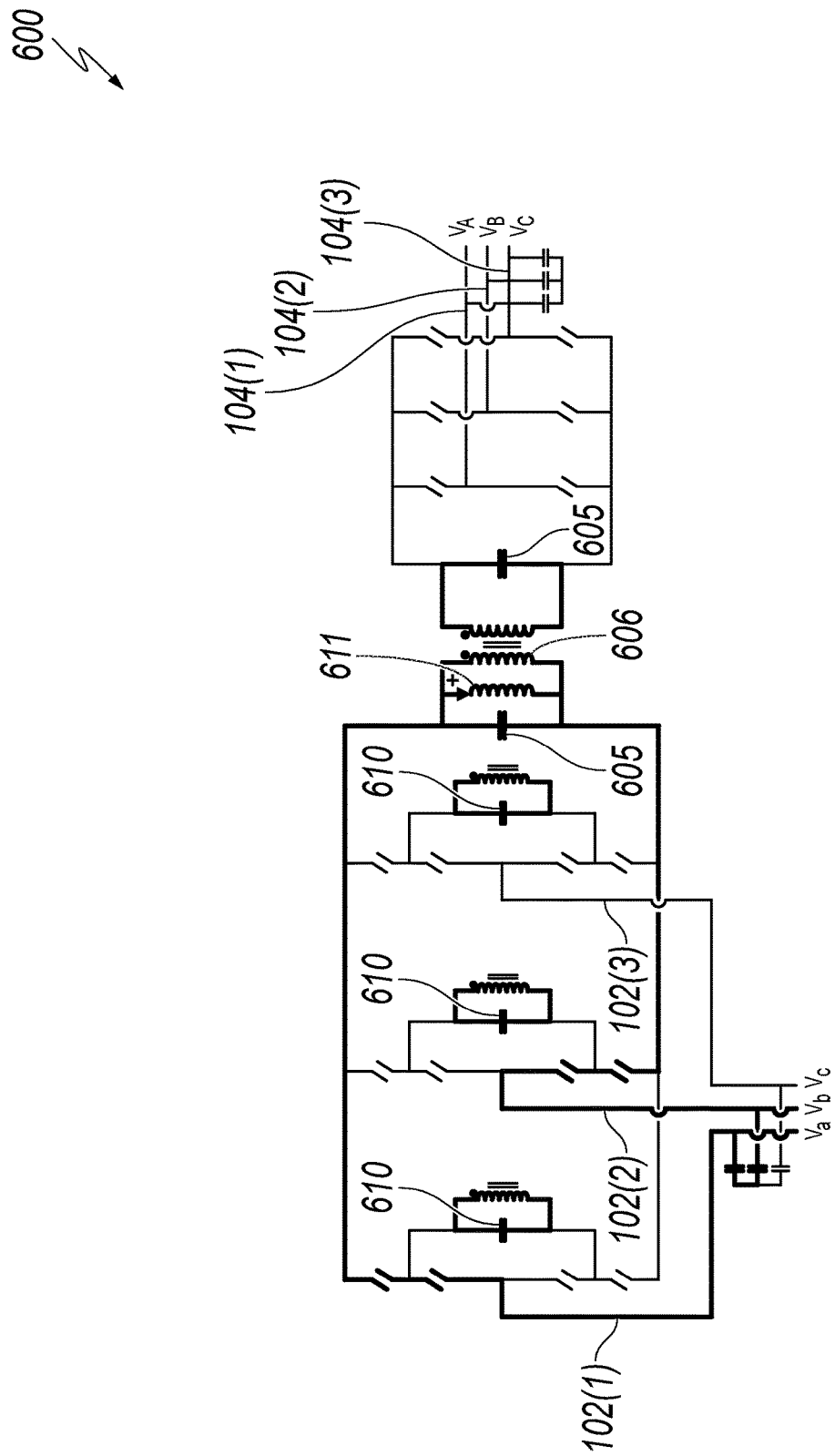
FIGS. 14A-14E are circuit diagrams illustrating modes of operation of the three-phase AC-AC buck-boost converter of FIG. 6.
Figure 14B:
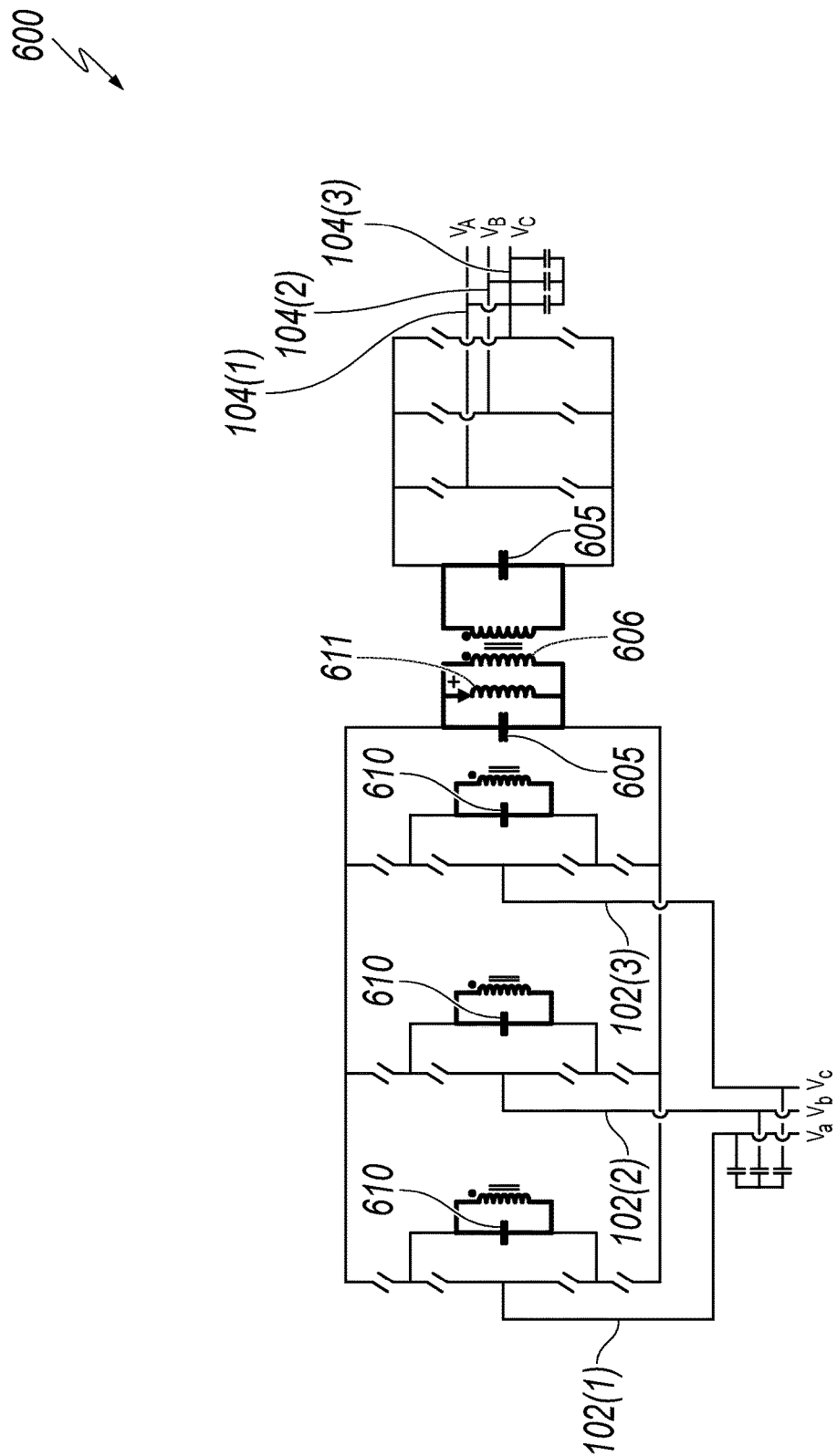
Figure 14C:
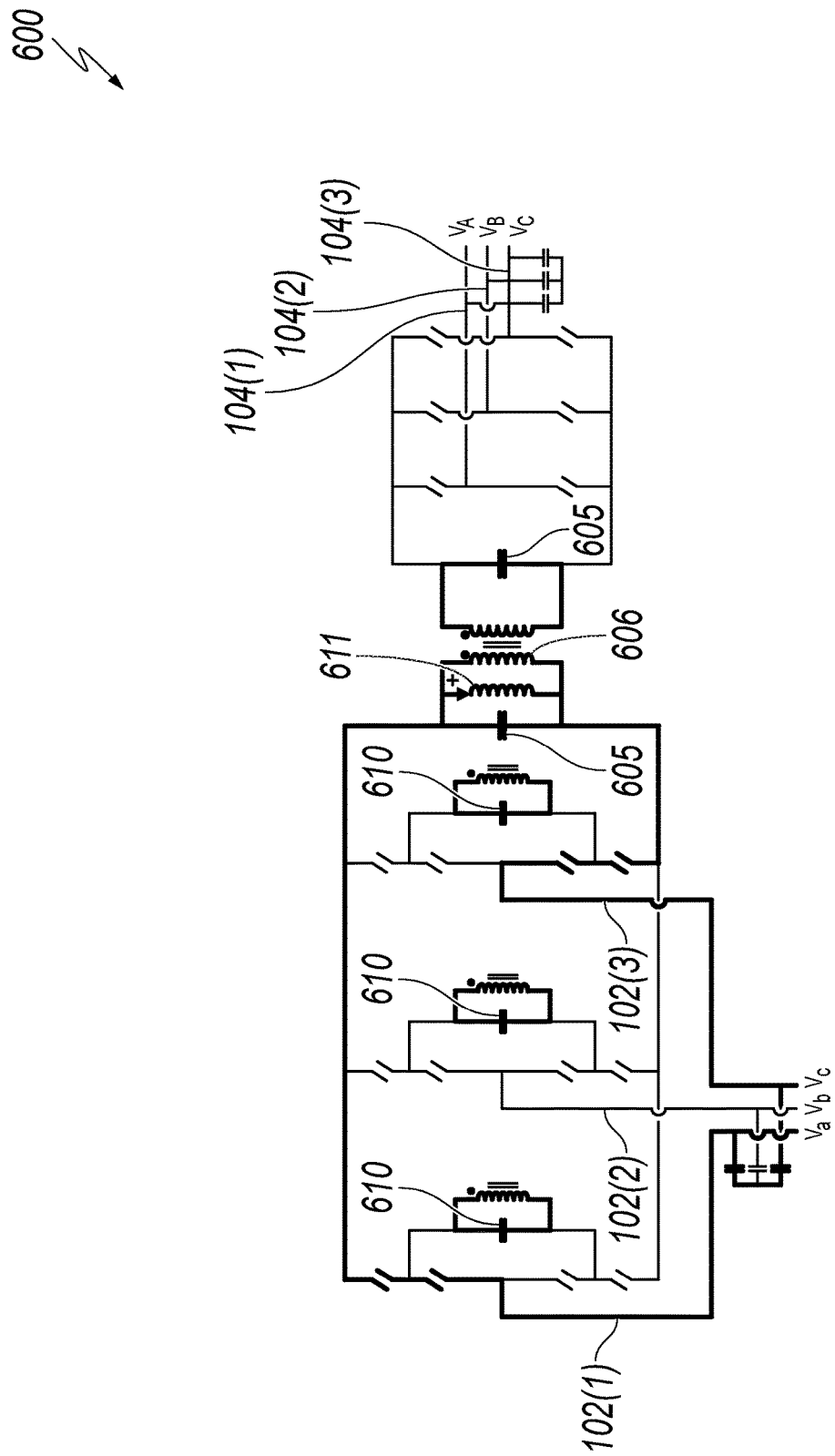
Figure 14D:
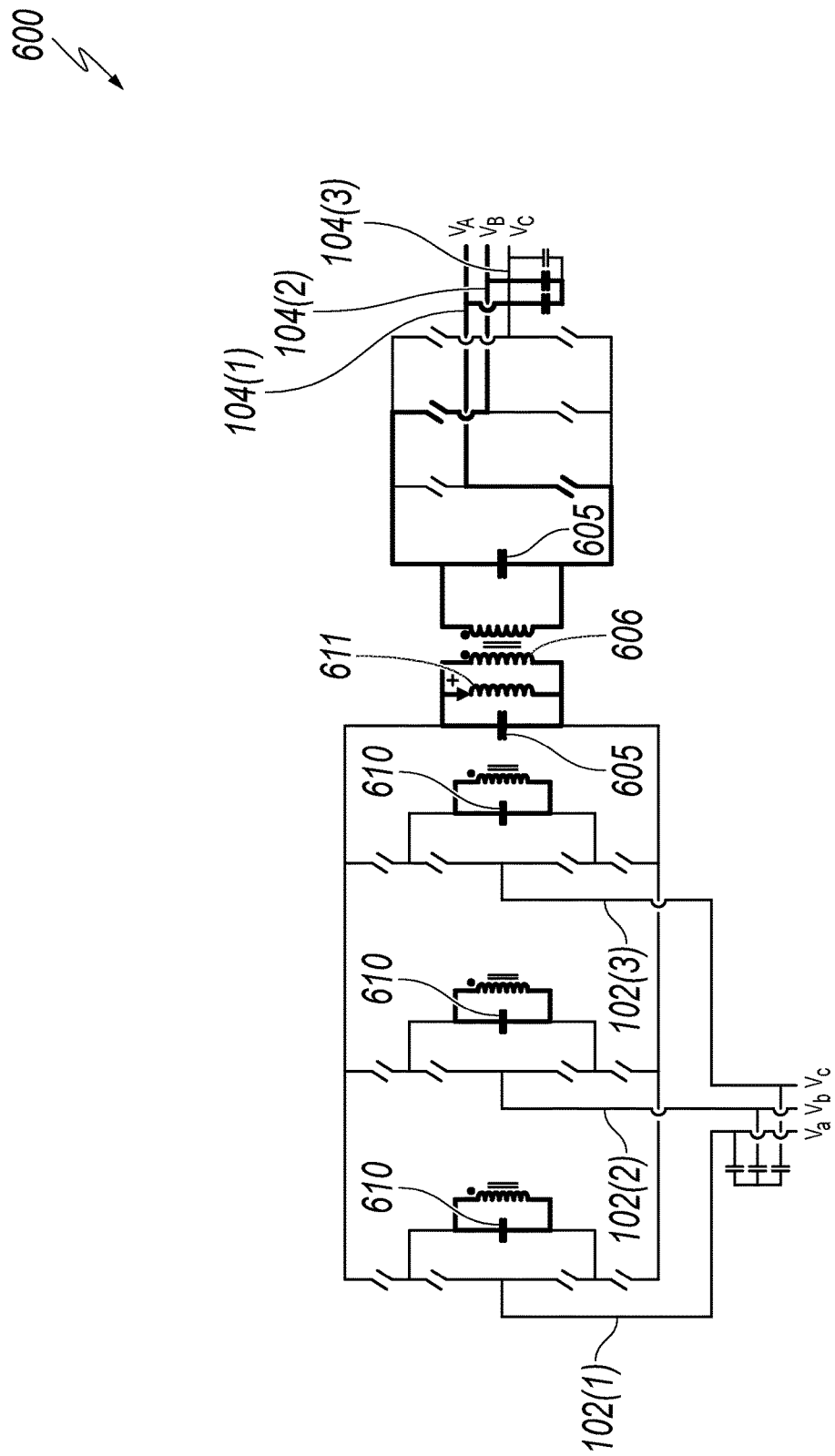
Figure 14E:
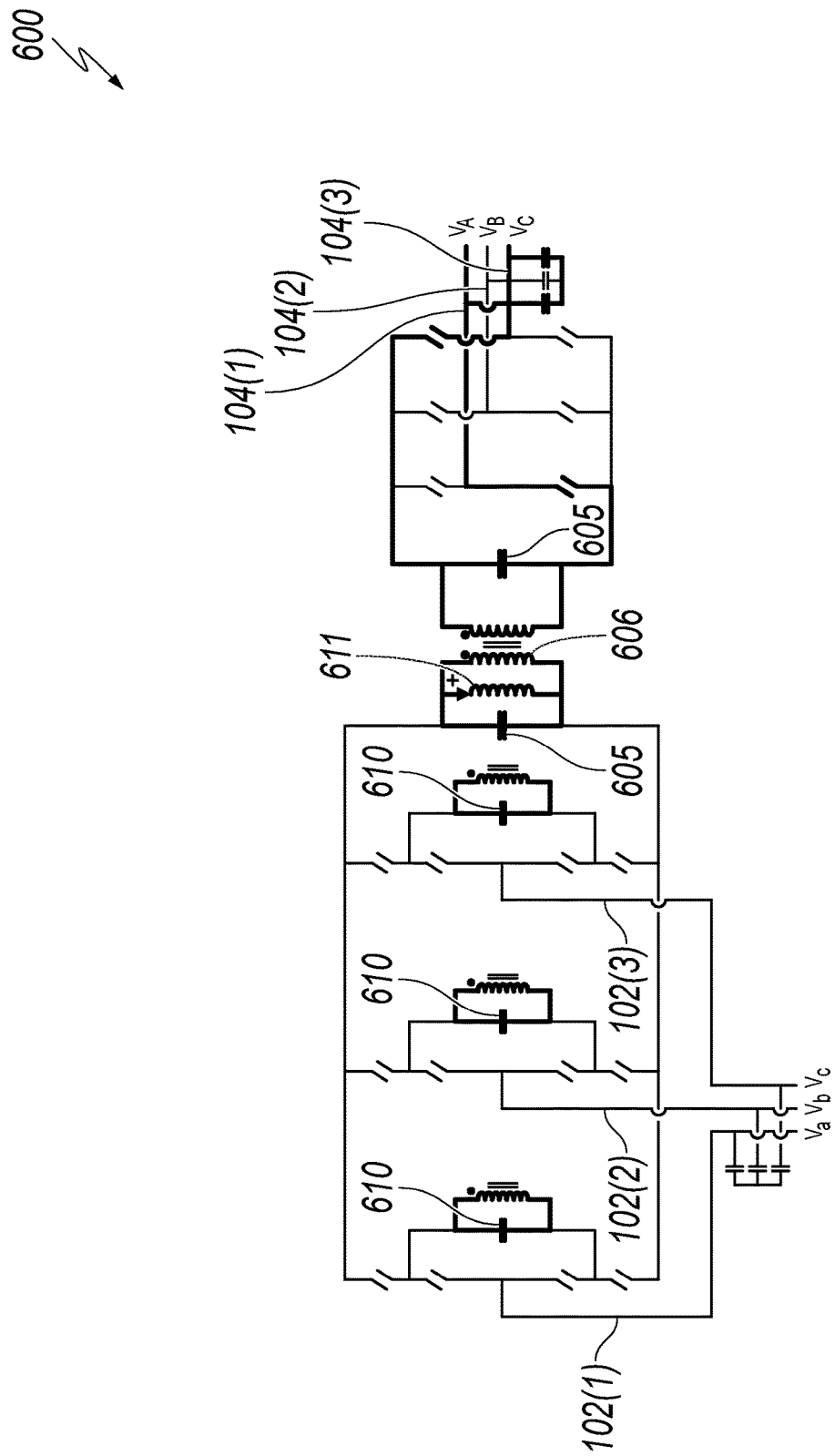

FIG. 10 is a circuit diagram of a DC-AC converter 1000. The DC-AC converter 1000 includes an input side 1002 and an output side 1004. In a typical embodiment, the input side 1002 is similar to the input side 702 discussed above with respect to FIG. 7. The output side 1004 includes a plurality of legs 1006(a)-(c) having a plurality of output semiconductor switches 1008. In a typical embodiment, the plurality of legs 1006(*a*)-(*c*) are similar to those discussed above with respect to FIGS. 3 and 6; however, in the case of the DC-AC converter 1000, the output semiconductor switches 1008 are bidirectional conducting and blocking switches similar to the switching device disclosed in FIG. 1C. In a typical embodiment, the output side 1004 of the DC-AC switching device 1000 provides power to a three-phase load. The DC-AC converter 1000 has all of the advantages of the isolated buck-boost DC-DC converter 700 shown in FIG. 7 such as, for example, isolation and a reduction factor of 1/K. In a typical embodiment, the DC-AC converter 1000 is not bidirectional. That is, power flows only from the input side 1002 to the output side 1004. However, in an embodiment, the converter 1000 can become an AC-DC converter if the switches on side 1000 are flipped upside down. The capacitors 1010 and 705 together with the inductor 1011 form a parallel resonant tank that partially resonates during operation of the DC-AC converter 1000.

In reference to DC-AC converter 1000 of FIG. 10, as stated before, the converter has a parallel resonant tank (hereinafter referred to as the link) that partially resonates during operation of the converter 1000. The link in the converter 1000 transfers energy by charging from the input and discharging into the selected output phase pairs. The link current and voltage are hereinafter referred to as the link current and link voltage, respectively. A link cycle is comprised of twelve operating modes as elaborated in the rest of this section. By no way of limitation and for the sake of brevity and simplicity of naming conventions, it is assumed that components are ideal. By no way of limitation, it is assumed that there are capacitive filters connected to the input and output terminals of the converters. There are periods when all semiconductor switches are in blocking mode and the link is not connected to either of the terminals, and therefore is allowed to resonate until the link voltage meets certain requirements. The resonant periods provide zero-voltage switching for every switch turn-on transition, and provide a reduced rate of voltage rise on the semiconductors at turn-off transitions.

Two modes charge the link from the input, and four modes discharge the link into the output. Partial resonance happens at the remaining six modes (even-numbered modes). In a typical DC-to-three-phase AC application, the input current reference may be a DC current and the output current references may be a set of sinusoidal currents.

Figure 18A:
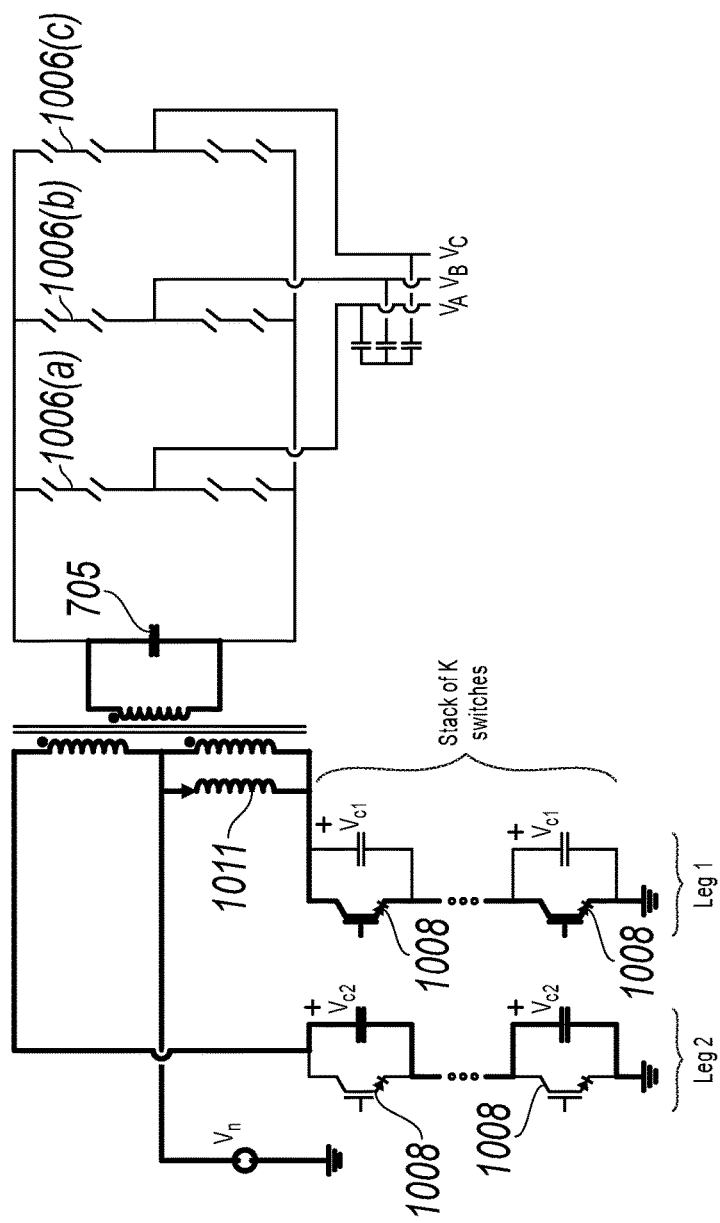
FIGS. 18A-18E are circuit diagrams illustrating modes of operation of the DC-AC converter of FIG. 10.
Figure 19:
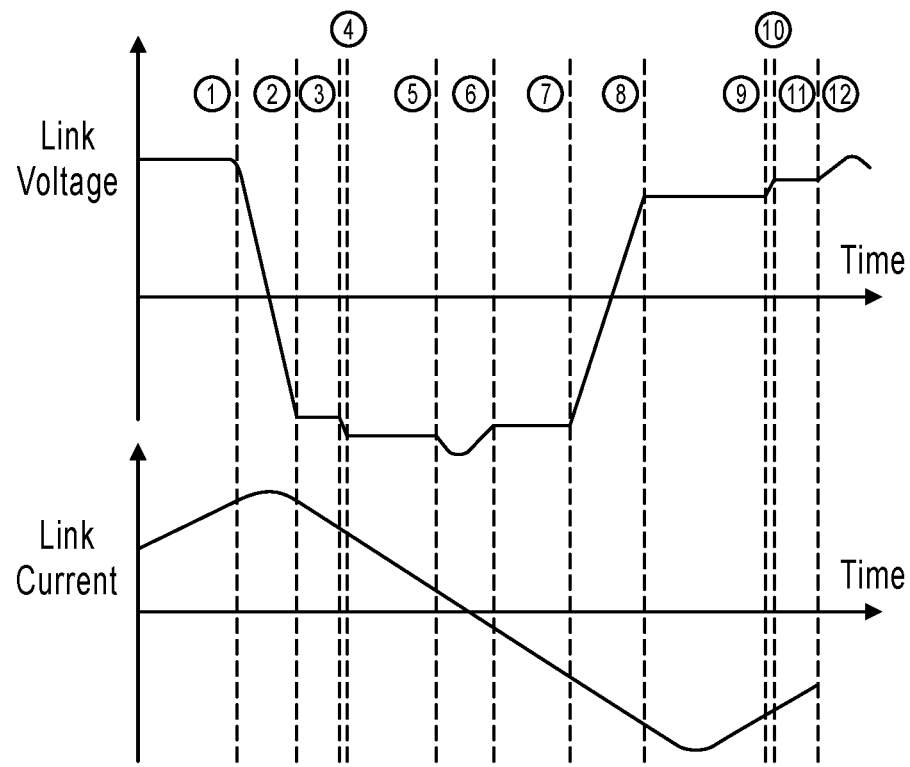
FIG. 19 is a plot of link current and link voltage versus time illustrating eight modes of operation of DC-AC conversion according to an exemplary embodiment.

Mode 1: The link is charged by the source through switches 1008 in leg 1 in reference to FIG. 10. All other switches 1008 are in their blocking state. The path and switches 1008 that carry current are showed in thick line in FIG. 18A. The values of capacitor voltages $v_{C1}$, $v_{C2}$, and link voltage are approximately 0, $2V_{in}/K$, and $V_{in}$, respectively. The link current increases linearly, as shown in FIG. 19. Once one half of the input current reference is met, switches 1008 in leg $S_1$ are gated off. The other half of the input reference is to be met in mode 7. Due to the presence of a capacitor in parallel with each switch in leg 1, the rate of rise of switch voltage at turn-off is limited. The capacitor is a loss-less snubber and effectively reduces the switching loss at turn-off.

Figure 18B:
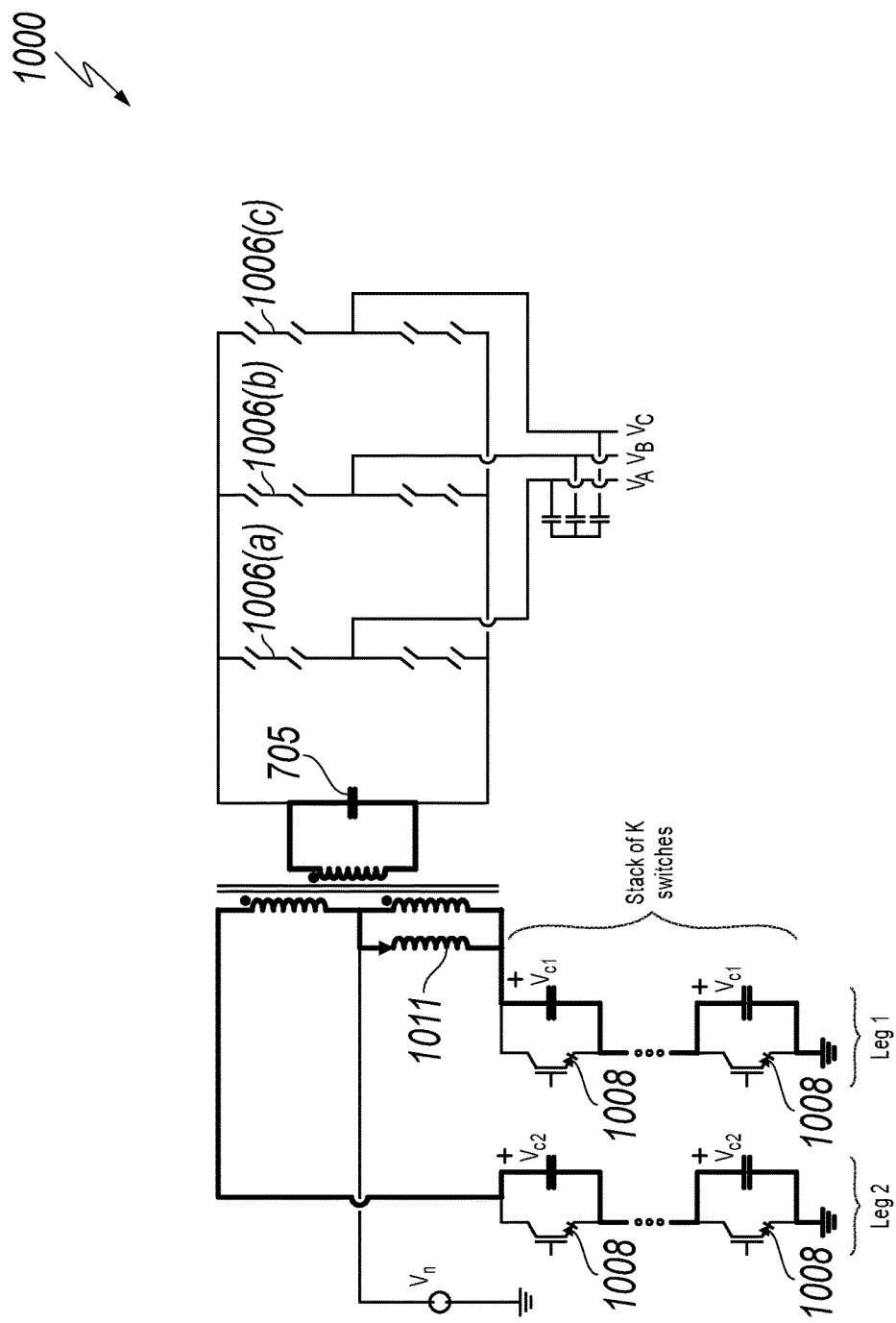

Mode 2: No switches 1008 carry current in this mode, therefore the link resonates and link voltage changes polarity, as shown in FIG. 19. The path of link current is shown in thick line in FIG. 18B. On the output side, out of the three output phase pairs AB, BC, and AC, the two pairs which accommodate the phase with the largest current reference magnitude are candidates for conduction in mode 3. Out of these two pairs, the pair with the smaller voltage difference magnitude is selected for mode 3, and the other is selected for conduction in mode 5. This leads to a descending voltage sequence as shown in FIG. 19, which leads to zero-voltage turn-on. Switches 1008 corresponding to the chosen pair start conducting only when the reflected link voltage through the transformer turns ratio matches the pair voltage difference. This ensures zero-voltage turn-on for all conducting switches.

Figure 18C:
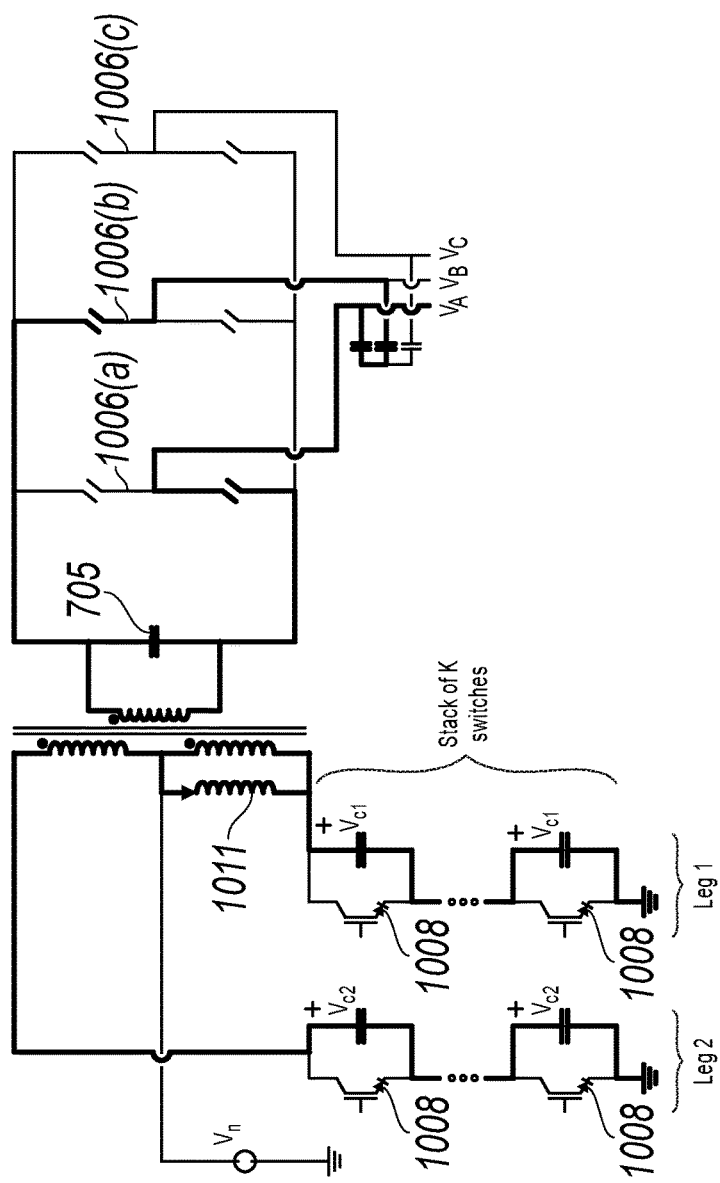

Mode 3: The link is discharged on the output pair and its current reduces almost linearly as shown in FIG. 19. Switches 1008 in the conducting phase pair should be selected in a way that the polarity of current in the conducting phases matches their references and the positive link current ramps down. For example, FIG. 18C shows the path and the conducting switches 1008 for the case where phase pair AB conducts. Current references for phases A and B in FIG. 18C is positive and negative, respectively. This mode continues until one of the phases in the pair, namely the phase with the smaller current reference, meets its current reference. At this moment the switches 1008 are gated off and mode 3 ends.

Mode 4: No switches 1008 carry current and the link resonates as shown in FIG. 19. The negative link voltage increases in magnitude, until it equals the reflected voltage difference of the selected output pair for mode 5. At this point, the switches 1008 corresponding to the pair start conducting to carry the positive link current. Selection of a proper phase pair for mode 5 was explained in mode 2. Similar to other resonant modes, zero-voltage switching at turn-on is achieved.

Figure 18D:
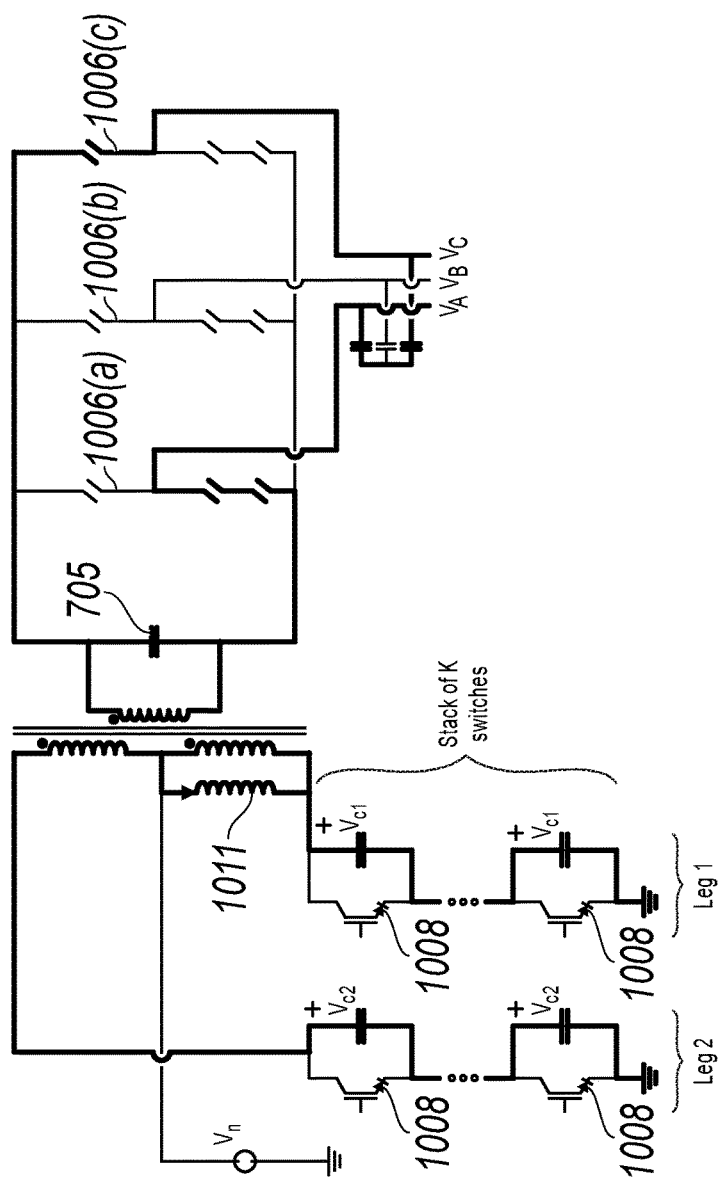
Figure 18E:
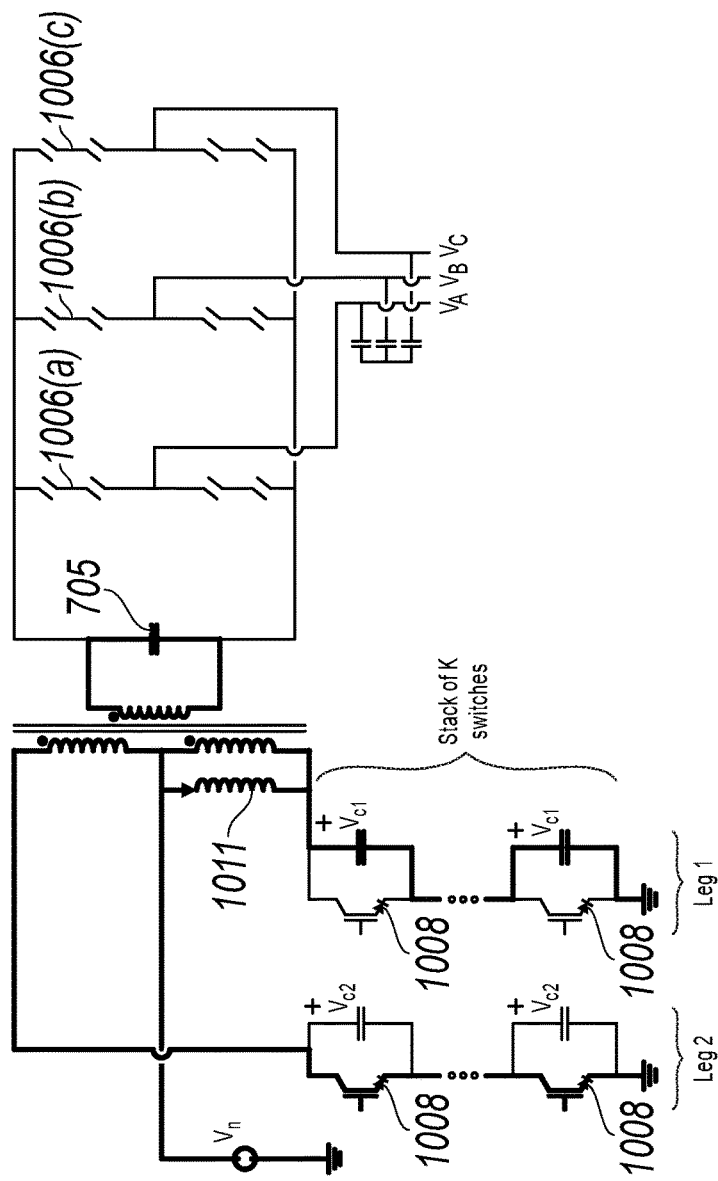

Mode 5: The selected output pair discharges the link, as shown in FIG. 19. Similar to mode 5, switches 1008 in the conducting phase pair should be selected in a way that the polarity of current in the conducting phases matches their references and the positive link current ramps down. For example, FIG. 18D shows the path and the conducting switches 1008 for the case where phase pair AC conducts. Current references for phases A and B in FIG. 18C is positive and negative, respectively. This mode continues until the energy in the link drops to a pre-determined level $E_{desired}$. This will be elaborated later. This mode ends by turning all switches 1008 off.

Mode 6: No switches 1008 carry current in this mode. With the left-over energy from mode 5 the link resonates and the negative link voltage grows in magnitude to have its negative peak, as shown in FIG. 19. At this point the link current changes direction. This mode ends when the link voltage equals the input phase pair with the largest current reference difference. Then switches 1008 in leg 2 on the input side are gated on at zero voltage to prepare the converter for mode 7.

As shown in FIG. 19, modes 7-12 follow essentially the same concept set forth for modes 1-6. However, the link current and voltage have reversed polarities as compared to modes 1-6. In modes 7-12, the link current experiences its negative half cycle. This allows bipolar utilization of the magnetic device and makes the converter capable of transferring power through both polarities of the link current, as is the case for all "double-ended" converters.

Selection of $E_{desired}$: It was mentioned earlier in description of modes that the requirement to end mode 6 and 12 is to have the energy left in the link reduced to a desired level, $E_{desired}$. This condition guarantees that the same amount of energy that was delivered to the link in mode 1, is taken from the link in modes 3 and 5, thereby indirectly balancing the input and output powers. Since $E_{desired}$ is the link energy content, it also determines the link peak voltage in modes 6 and 12. While using $E_{desired}$ as criteria is an effective way to end modes 6 and 12, it is not the only way and it is just one of many ways (No limitation).

The advantages of the present disclosure will be apparent to one skilled in the art. First, the power converters described herein allow high conversion efficiency with approximately 90% lower temperature when compared to conventional power converters. This reduces the cooling needs associated with the power converters described herein. Second, the power converters described herein provide galvanic isolation, which eliminates problems associated with ground currents. Third, the power converters described herein reduce voltage stress on semiconductor switching devices. The power converters described herein are also able to maintain a flow of electric power when a stacked semiconductor switch fails. Such a characteristic offers greater reliability and redundancy. Finally, the power converters described herein do not utilize electrolytic capacitors, which leads to a longer service life of the power converters.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the disclosure should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A power converter comprising:
  a multiple-winding transformer, the multiple-winding transformer providing an electromagnetic link between an input side and an output side of the power converter, the input side being arranged into a plurality of input phase legs, the output side being arranged into a plurality of output phase legs;
  an inductor arranged on at least one of the input side or the output side of the power converter in parallel with the multiple-winding transformer;
  at least one first capacitor arranged on the input side of the power converter in parallel with the multiple-winding transformer and the inductor;
  at least one second capacitor arranged on the output side of the power converter in parallel with the multiple-winding transformer, the inductor, the at least one first capacitor, and the at least one second capacitor defining a parallel resonance tank;
  each input phase leg of the plurality of input phase legs comprising:
    a first pair of bidirectional blocking and conducting switching devices coupled to a third capacitor and a first auxiliary transformer winding;
    a second pair of bidirectional blocking and conducting switching devices coupled to the first pair of bidirectional blocking and conducting switching devices, a fourth capacitor, and a second auxiliary transformer winding; and
    a third pair of bidirectional blocking and conducting switching devices coupled to the second pair of bidirectional blocking and conducting switching devices, the at least one first capacitor, the inductor, and the multiple-winding transformer
  each output phase leg of the plurality of output phase legs comprising:
    a fourth pair of blocking and conducting switching devices coupled to a fifth capacitor and a third auxiliary transformer winding; and
    a fifth pair of block and conducting switching devices coupled to the fourth pair of blocking and conducting switching devices, the at least one second capacitor, and the multiple-winding transformer.

2. The power converter of claim 1, wherein the first pair of bidirectional blocking and conducting switching devices, the second pair of bidirectional blocking and conducting switching devices, and the third pair of bidirectional blocking and conducting switching devices comprise a semiconductor switch.

3. The power converter of claim 1, wherein the input side and the output side are bi-directional.

4. The power converter of claim 1, wherein the multiple-winding transformer provides galvanic isolation between the input side and the output side.

5. The power converter of claim 1, wherein one input phase leg is associated with one input phase of a plurality of input phases.

6. The power converter of claim 1, wherein one output phase leg is associated with one output phase of a plurality of output phases.

7. A method of power conversion, the method comprising:
  charging a parallel resonance tank with current from a first pair of input phase legs, each phase leg of the first pair of input phase legs comprising:
    a first pair of bidirectional blocking and conducting switching devices coupled to a third capacitor and a first auxiliary transformer winding;
    a second pair of bidirectional blocking and conducting switching devices coupled to the first pair of bidirectional blocking and conducting switching devices, a fourth capacitor, and a second auxiliary transformer winding; and
    a third pair of bidirectional blocking and conducting switching devices coupled to the second pair of bidirectional blocking and conducting switching devices, the at least one first capacitor, and a multiple-winding transformer;
  resonating the parallel resonance tank as a voltage of the parallel resonance tank decreases in magnitude;
  charging the parallel resonance tank with current from a second pair of input phase legs, each phase leg of the second pair of input phase legs comprising:

the first pair of bidirectional blocking and conducting switching devices coupled to the third capacitor and the first auxiliary transformer winding;

the second pair of bidirectional blocking and conducting switching devices coupled to the first pair of bidirectional blocking and conducting switching devices, the fourth capacitor, and the second auxiliary transformer winding; and the third pair of bidirectional blocking and conducting switching devices coupled to the second pair of bidirectional blocking and conducting switching devices, the at least one first capacitor, and the multiple-winding transformer;

resonating the parallel resonance tank as the voltage of the parallel resonance tank changes polarity;

discharging the parallel resonance tank on a first pair of output phase legs, each phase leg of the first pair of output phase legs comprising:

a fourth pair of blocking and conducting switching devices coupled to a fifth capacitor and a third auxiliary transformer winding; and a fifth pair of block and conducting switching devices coupled to the fourth pair of blocking and conducting switching devices, the at least one second capacitor, and the multiple-winding transformer;

resonating the parallel resonance tank as link voltage increases in magnitude; and discharging the parallel resonance tank on a second pair of output phase legs, each phase leg of the second pair of output phase legs comprising:

the fourth pair of blocking and conducting switching devices coupled to the fifth capacitor and the third auxiliary transformer winding; and the fifth pair of block and conducting switching devices coupled to the fourth pair of blocking and conducting switching devices, the at least one second capacitor, and the multiple-winding transformer.

8. The method of claim 7, wherein:

the first input phase pair has a greater current reference difference than any other phase pair;

a current reference difference of the second input phase pair is less than the current reference difference of the first input phase pair; and a current reference difference of the first output phase pair is smaller than a current reference difference of the second output phase pair.

\* \* \* \* \*